United States Patent [19]
Phillips

[11] Patent Number: 5,544,715
[45] Date of Patent: Aug. 13, 1996

[54] METHOD AND APPARATUS FOR ENHANCING STABILITY IN SERVO SYSTEMS COMPRISING HYDRO-MECHANICALLY DRIVEN ACTUATORS

[75] Inventor: Edward H. Phillips, Troy, Mich.

[73] Assignee: Edward H. Phillips-Techo Corp., Troy, Mich.

[21] Appl. No.: 357,158

[22] Filed: Dec. 15, 1994

Related U.S. Application Data

[63] Continuation of Ser. No. 69,631, Jun. 1, 1993, abandoned.

[51] Int. Cl.⁶ .............................. B62D 5/06; F16D 3/00
[52] U.S. Cl. .................. 180/417; 180/430; 267/140.3; 267/141.2; 384/215; 403/203; 403/225
[58] Field of Search ...................... 180/132, 135, 180/140, 150, 156, 160; 384/215; 403/203, 225, 291; 267/140.3, 140.5, 141.2, 141.3, 141.4, 141.5, 141.7; 464/180

[56] References Cited

U.S. PATENT DOCUMENTS

| | | | |
|---|---|---|---|
| 1,778,503 | 10/1930 | Lord | 267/141.2 |
| 1,820,220 | 8/1931 | Geyer | 384/215 |
| 2,367,826 | 1/1945 | Kubaugh | 267/140.3 |
| 2,757,028 | 7/1956 | Latzen | 403/203 |
| 3,228,673 | 1/1966 | Hinks | 384/215 |
| 3,337,232 | 8/1967 | Peickii et al. | 403/225 |
| 3,365,213 | 1/1968 | Bentley et al. | 403/225 |
| 3,399,851 | 9/1968 | Racca | 267/140.3 |
| 3,467,421 | 9/1969 | Bentley | 403/203 |
| 4,475,615 | 10/1984 | Stanek | 180/132 |
| 4,594,009 | 6/1986 | Gutris | 384/215 |
| 4,667,530 | 5/1987 | Mettler et al. | 403/225 |
| 4,673,314 | 6/1987 | Hara et al. | 267/140.3 |
| 4,694,926 | 9/1987 | Kikkawa | 180/132 |
| 4,834,416 | 5/1989 | Shimoe et al. | 267/141.2 |
| 5,056,763 | 10/1991 | Hamada et al. | 267/141.2 |
| 5,224,790 | 7/1993 | Hein | 267/140.3 |
| 5,288,059 | 2/1994 | Gautheron et al. | 267/141.2 |

*Primary Examiner*—Mitchell J. Hill
*Attorney, Agent, or Firm*—Gifford, Krass, Groh Sprinkle, Patmore, Anderson & Citkowski P.C.

[57] ABSTRACT

Methods and devices for enhancing shudder stability in servo systems comprising hydro-mechanically driven actuators are disclosed. Series damping devices forming compliant couplings having series damping characteristics are disclosed. The series damping devices are utilized for mounting the hydro-mechanically driven actuators or coupling them to load elements which they position. The improvement consisting of providing series damping associated with the hydro-mechanically driven actuators for absorbing sufficient energy to provide adequate gain and phase margins for the open-loop feedback characteristics of systems utilizing the hydro-mechanically driven actuators in order to substantially prevent high frequency shudder from occurring during operation of the systems.

10 Claims, 14 Drawing Sheets

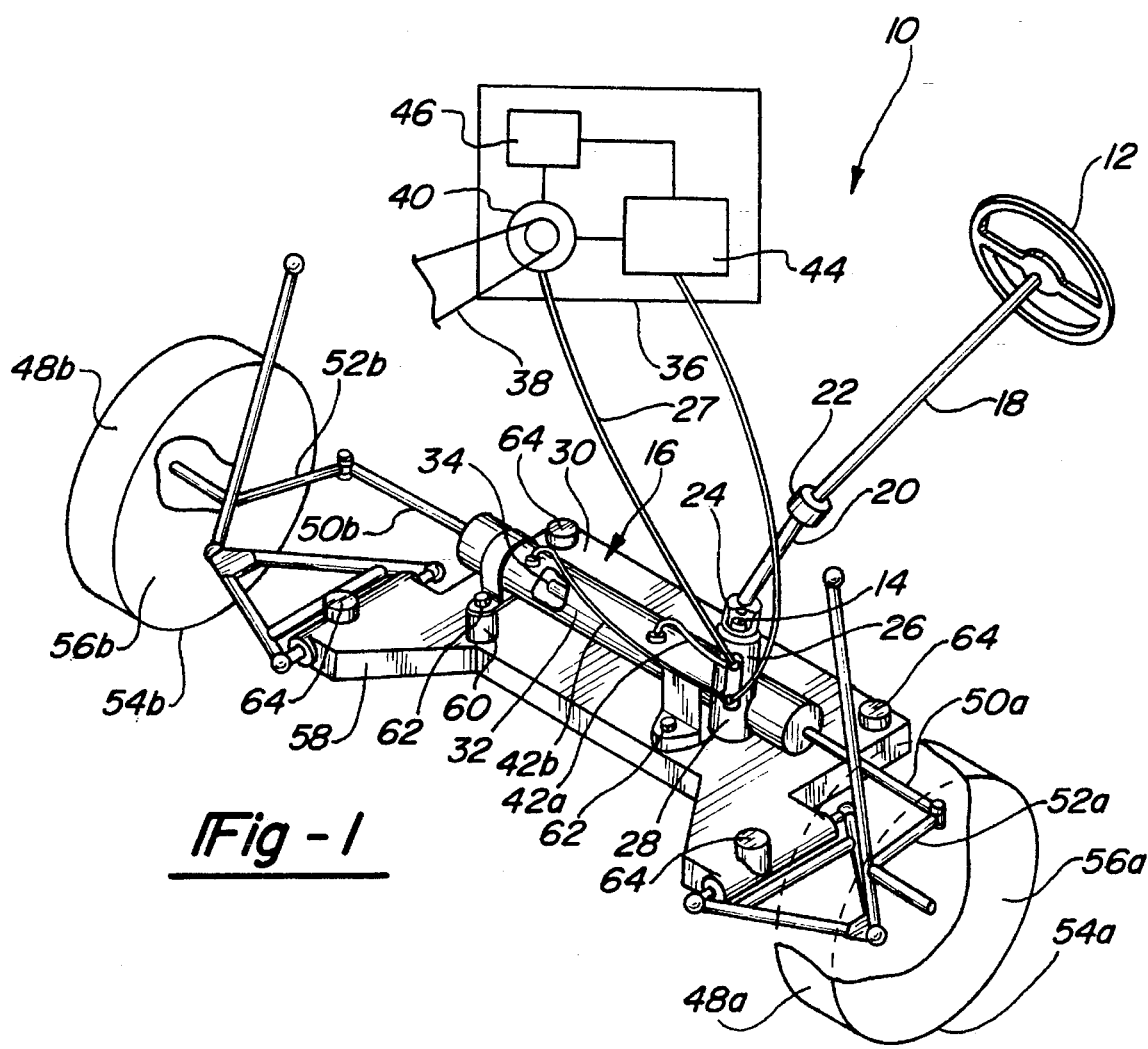

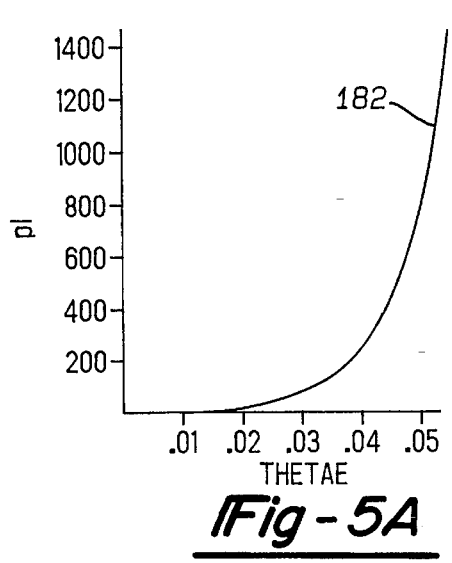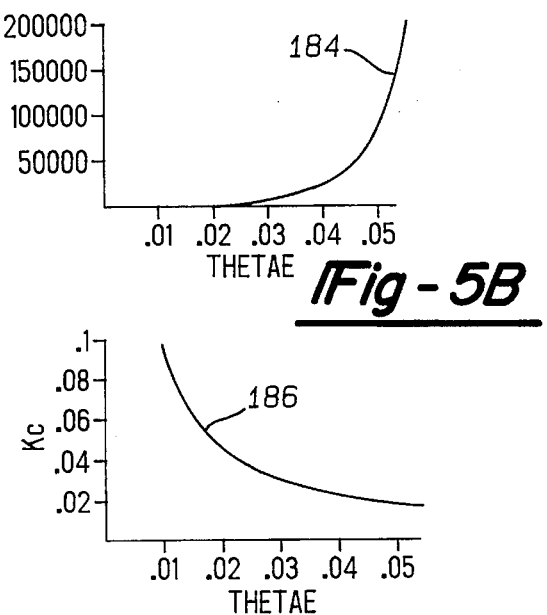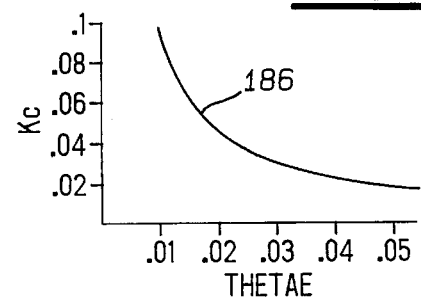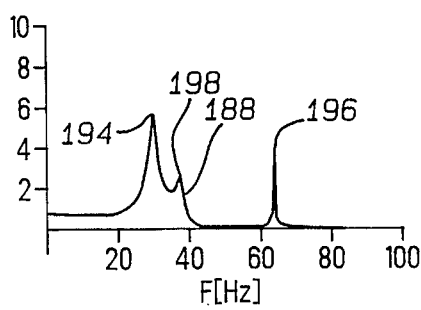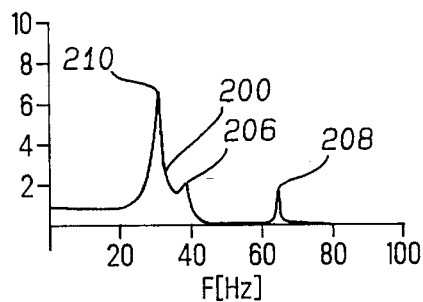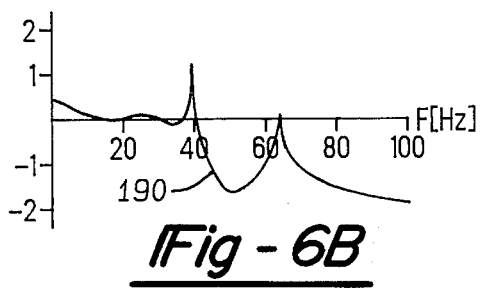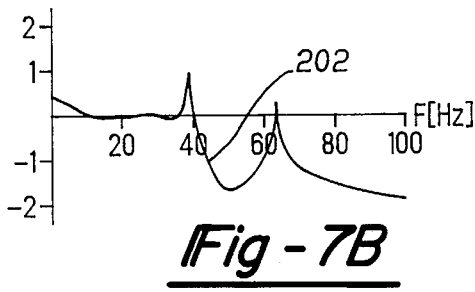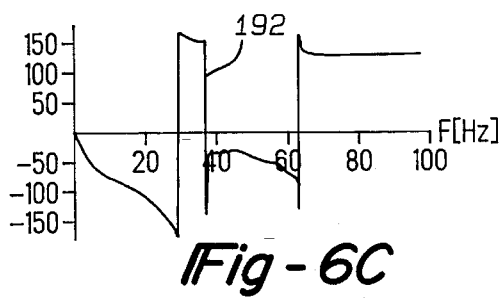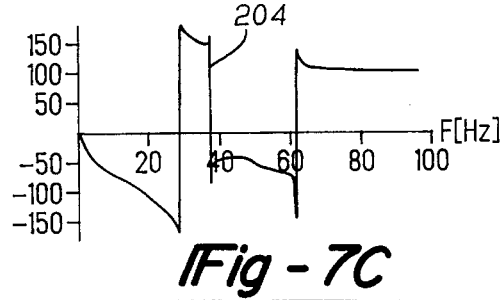

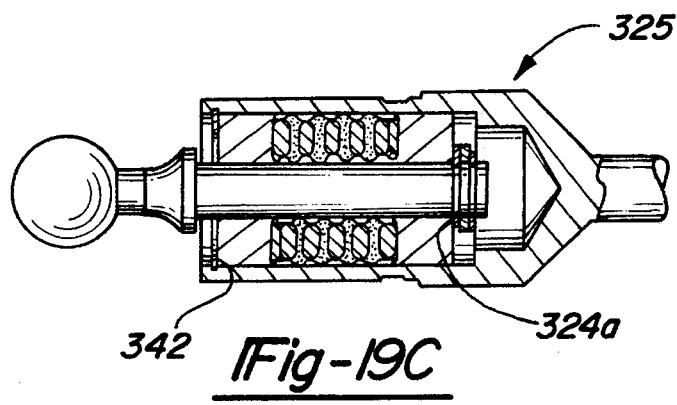
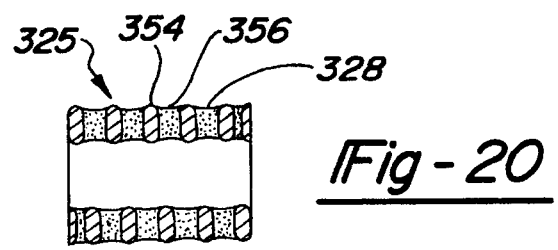
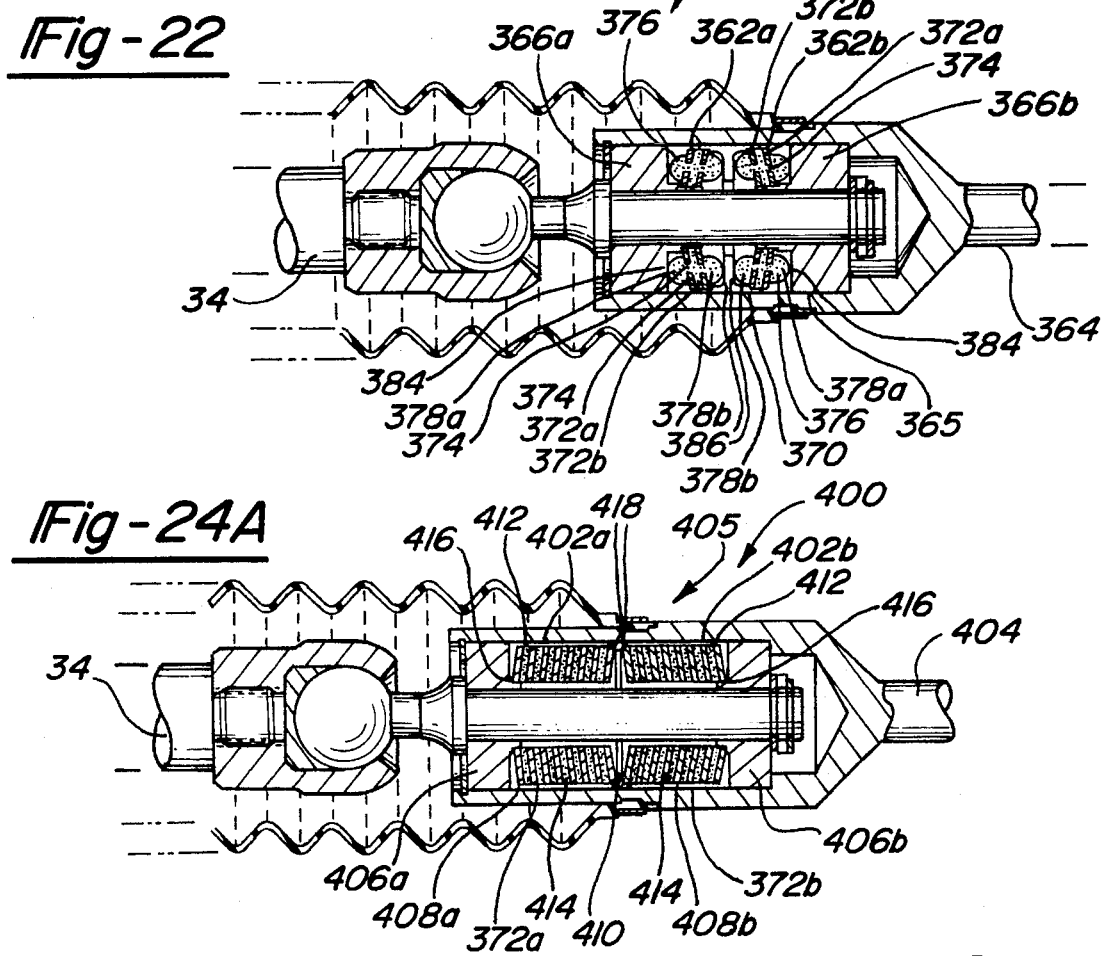

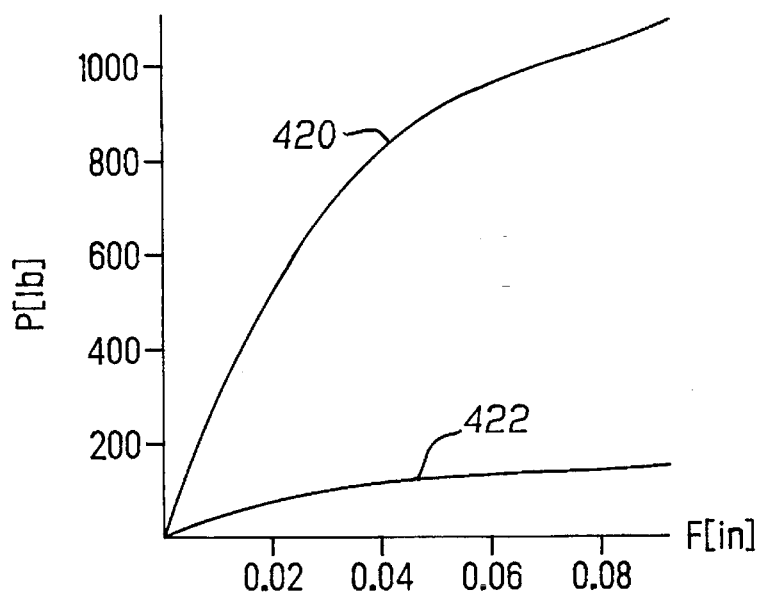
_Fig - 25A_
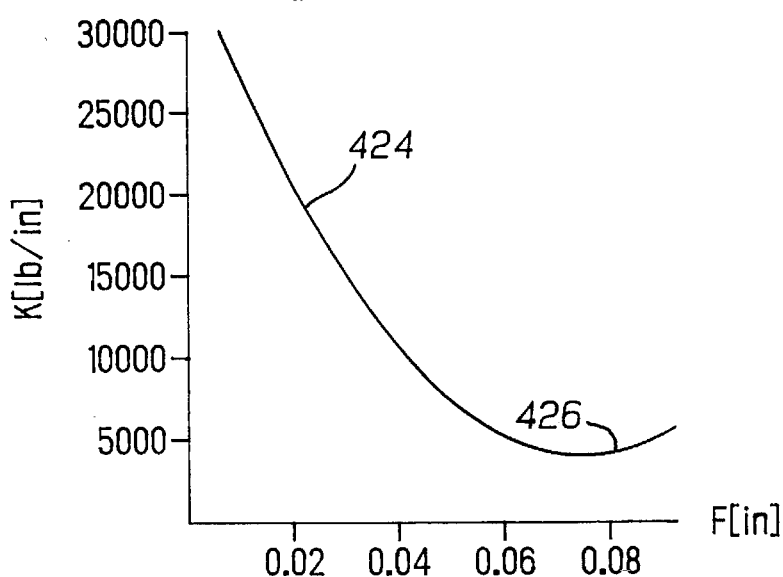
_Fig - 25B_

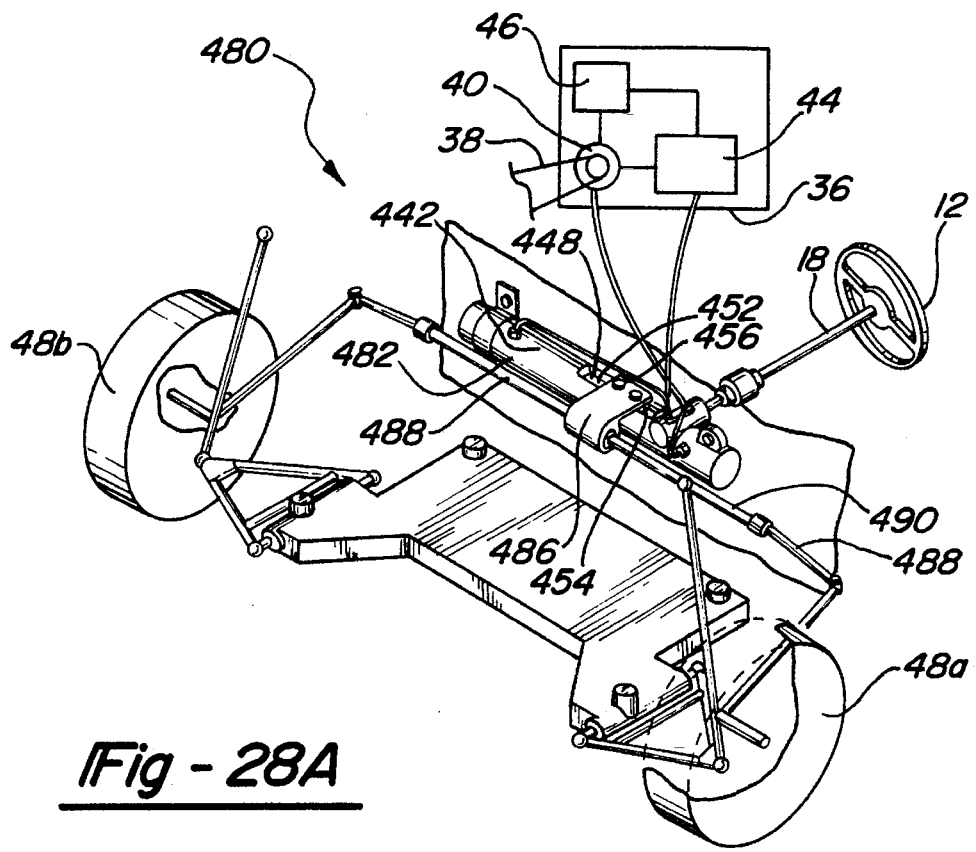
*Fig - 28A*
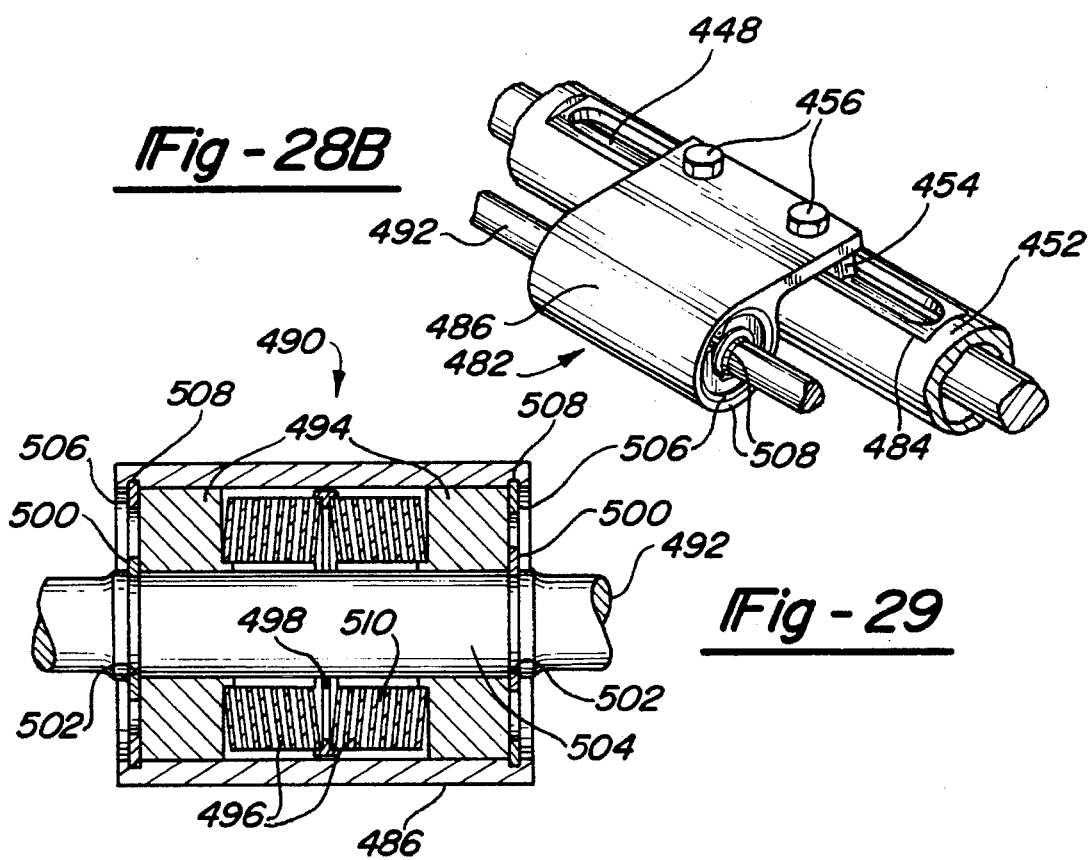
*Fig - 28B*
*Fig - 29*

METHOD AND APPARATUS FOR ENHANCING STABILITY IN SERVO SYSTEMS COMPRISING HYDRO-MECHANICALLY DRIVEN ACTUATORS

This is a continuation of copending applications Ser. No. 08/069,631 filed on Jun. 1, 1993 now abandoned.

BACKGROUND OF THE INVENTION

I. Field of the Invention

The present invention relates generally to servo systems comprising hydro-mechanically driven actuators and, more particularly, to enhancing high frequency shudder stability of such systems with particular reference to their utilization in vehicular power steering systems.

II. Description of the Prior Art

The widest use of servo systems comprising hydro-mechanically driven actuators is found in the vehicular power steering art where high frequency shudder has been a major problem. High frequency shudder is the result of inherent dynamic instability found in many vehicular power steering systems. It is known in the art to reduce high frequency shudder by a variety of techniques including utilizing elastomeric bushings within tie-rod linkage assemblies, reducing steering control valve gain, modifying fluid supply line assemblies, and adding supplemental motion control dampers. Among these techniques, damping provided by supplemental motion control dampers can effectively modify servo feedback characteristics of vehicular power steering systems such that their operational stability is significantly enhanced. However, such supplemental motion control dampers result in increased steering efforts with respect to steering wheel rotation and generally take the form of gas-filled shock absorbers which are relatively expensive and difficult to mount. Thus, they are usually added to vehicular power steering systems only as a last resort.

The other three stabilizing methods are more commonly utilized. Their functions differ in fundamental ways. Elastomeric bushings in tie-rod linkage assemblies tend to eliminate harshness and excessive sensitivity in "down-the-road" and handling phases of vehicle maneuvering by increasing compliance and introducing series damping between steering gear and dirigible wheel portions of the host power steering system. The elastomeric bushings also delay onset of shudder until higher values of steering force are encountered such as during parking on dry pavement or brushed concrete with the host vehicle stationary. However, when steering loads reach such high levels, the elastomeric bushings are usually so heavily loaded that they loose most of their compliance and damping qualities, and they are substantially ineffective in eliminating shudder.

On the other hand, reducing control valve gain is thought to enhance system stability in a manner similar to that provided by motion control dampers. However, as will be fully explained below, this procedure is only marginally effective in modifying servo feedback characteristics and reducing shudder. Because of this, associated fluid supply lines are often tinkered in an attempt to negate system disturbances generated by the host power system's power steering pump, as is also described below.

Stability problems associated with servo systems are discussed by DiStefano, Stubberud, and Williams in *Schaum's Outline of Theory and Problems of Feedback and Control Systems* published by the McGraw-Hill Book Company. As discussed in that book, servo systems can oscillate via self excitation at any frequency whereat unity gain open-loop feedback coincides with an odd multiple of 180 degree phase shift. However, shudder instability is rarely self excited because exact combinations of unity gain open-loop feedback coupled with odd multiples of 180 degree phase shift are seldom encountered. Rather, such servo systems are characterized by near confluence of these conditions over an unusually wide frequency span. Thus, shudder instability is usually encountered as an amplification of periodic variations in hydraulic flow provided by an engine driven power steering pump. Typically an engine operating at low speeds (especially when the engine is operated in a loaded condition such as being in gear with the air conditioner on) has significant variations in its speed. Since the pump is driven by the engine, it has substantially identical variations in both speed and output flow rate. The primary cause of the variation of engine rotational speed is the individual power pulses determined by the firing frequency of the engine's cylinders. A six cylinder engine has three power strokes per revolution and when operated at idle speed in a manner such as that described above, may have a firing frequency of about 33 Hz with an associated rotational speed ripple of approximately 10% from peak-to-peak.

When operated in a parking mode as described above, the host vehicle's steering gear is under maximum load. At maximum load its control valve is internally deflected such that it significantly restricts pump output flow in order to concomitantly develop maximum values of pump output pressure. When the control valve is so deflected it couples the pump output pressure to a power piston member of the steering gear in a substantially direct manner. Since the pump output pressure is generated by a combination of closing variable flow control orifices, its value is primarily governed by the general orifice flow equation $$Q = C_d A (2P/\rho)^{0.5}$$

where Q is flow through the control valve, the product $C_d A$ is net effective valve orifice area, $\rho$ is fluid density and P is the pump output pressure. As a result, the pump output pressure is proportional to the square of pump output flow and is thus subject to an approximate 20% peak-to-peak variation at about 33 Hz. Because of this, supply line assembly materials and lengths are often altered in an attempt to achieve line resonances with an approximate dynamic pressure null at the control valve. Sometimes it is additionally necessary to provide a flow restricting device in the return line of the supply line assembly. Tinkering with the supply line assembly to achieve high frequency stability is generally regarded as being marginally acceptable at best because the underlying stability problem still exists in unaltered form. Thus, it is present in all vehicles so equipped and can reappear dramatically in selected vehicles that differ from norm. The differences between supposedly identical vehicles are quite undefined and can occur in the form of such things as missed structure welds, loose fasteners, unusual tolerance buildups and the like.

SUMMARY OF THE INVENTION

Accordingly, the present invention is directed to methods and devices for economically enhancing high frequency shudder stability in servo systems comprising hydro-mechanically driven actuators. The methods and devices are more particularly directed to reducing, or even eliminating, servo system instabilities associated with such actuators as installed in and operating on mechanically resonant structures and sub-assemblies via introduction of series damping devices. As will be fully described below, vehicular power steering systems embody such installations of servo systems comprising hydro-mechanically driven actuators. It is therefore an object of the invention to eliminate shudder in vehicular power steering systems, particularly during parking maneuvers.

In a vehicular power steering system its steering unit is commonly mounted to a system of structural members each having a spring-mass character. Furthermore, dirigible wheel assemblies comprising flexible tires are positioned via members also having a spring-mass character. The various resonances associated with all of these elements interacting with the hydro-mechanical gain characteristics of the control valve and power cylinder components often results in the servo stability problems noted above. It has been found that it is possible to significantly reduce system gain and/or lagging phase angle in servo systems comprising hydro-mechanically driven actuators via introducing series damping between various of these elements. This results in a significant change in stability criterion for such systems and a marked reduction in their tendency to shudder.

In a preferred embodiment, an improved method of mounting a power cylinder comprising series damping is utilized in coupling the hydro-mechanically driven actuator's power cylinder portion to a supporting sub-frame or frame member. A first type of series damping device is used to absorb energy whenever reaction forces cause the power cylinder to move. This effectively modifies system feedback characteristics by reducing both servo gain and lagging phase angle at shudder susceptible frequencies in a manner that tends to reduce oscillatory signal amplification and therefore shudder. The first type of series damping device comprises first and second Belleville spring washers and first and second bumpers formed from mechanically lossy elastomeric material. Lossy refers to the ability of a material to attenuate energy. The Belleville spring washers are configured with large values of overall height relative to their thickness with the result that their spring characteristics are non-linear. This results in a transition from high to relatively low values of spring rate as they are compressed. Thus, relatively small values of initial compliance are imposed on host actuators at light loads. On the other hand, larger values of compliance are available to effect the desired gain and phase angle reductions at high loads associated with parking maneuvers. The improved series damping device utilizes the first and second Belleville spring washers and first and second bumpers in the following combinations: The first Belleville spring washer and first bumper are disposed in parallel to oppose forces applied in a first direction, and the second Belleville spring washer and second bumper are disposed in parallel to opposing forces applied in the opposite direction.

In a first alternative preferred embodiment, an improved method of linking the hydro-mechanically driven actuator's driven member to its load is utilized. A second type of series damping device is used to absorb energy under shudder susceptible conditions and effectively modifies system feedback characteristics by reducing both servo gain and lagging phase angle in a manner that tends to reduce oscillatory signal amplification and therefore shudder. In a power steering system, the second type of series damping device couples a piston-and-rack assembly to tie-rod members. The second type of series damping device comprises a single spring member encased in mechanically lossy elastomeric material. The spring member is retained within a preloaded double acting mechanism similar to a known preload mechanism utilized in a prior art reaction type power steering valve as described in *Mark's Handbook for Mechanical Engineers* published by the McGraw-Hill Book Company. In operation, no supplemental compliance is contributed by the second type of series damping device for applied force values less than preload value. When applied force values from either direction exceed the preload value, the preloaded double acting mechanism allows progressive compression of the single spring member and deformation of the lossy elastomeric material to occur.

In a second alternative preferred embodiment, another improved tie-rod coupling is utilized to introduce a third type of series damping device between the piston-and-rack assembly and tie-rod members. The third type of series damping device comprises two identical spring members each comprising a pair of Belleville spring washers having non-linear spring characteristics separated by and encased in mechanically lossy elastomeric material which supplementally forms bumpers on either side. The spring members are mounted back-to-back and retained within a preloaded double acting mechanism. When applied force values from either direction exceed preload value, the double acting mechanism allows progressive compression of the Belleville spring washers and bumpers. Concomitant energy loss is effected by both compressive deformation of the bumper portions and shear deformation of the lossy elastomeric material located between the Belleville spring washers.

In a third alternative preferred embodiment, another improved tie-rod coupling is utilized to introduce a fourth type of series damping device between the hydro-mechanically driven actuator's power piston and tie-rod members. The fourth type of series damping device comprises two identical spring members each comprising a plurality of Belleville spring washers having non-linear spring characteristics separated by and encased in mechanically lossy elastomeric material. The spring members are mounted back-to-back in a manner that allows them to hyper-compress to an inverted form at ultimate load values. They are also retained within a preloaded double acting mechanism. When applied force values from either direction exceed preload value, the double acting mechanism allows progressive compression of the Belleville spring washers. Concomitant energy loss is effected by shear deformation of the lossy elastomeric material located between the Belleville spring washers.

In a fourth alternate preferred embodiment, an improved tie-rod mounting is utilized to introduce any of the second, third or fourth types of series damping devices between a hydro-mechanically driven power piston-and-rack assembly of a Center Take-off rack-and-pinion equipped power steering system and its tie-rod linkage assembly. Of these, the fourth type of series damping device is illustrated as an exemplary case. In the fourth alternate preferred embodiment, only one of the damped compliant couplings is required because of the central location of the attachment of the tie-rod linkage assembly.

BRIEF DESCRIPTION OF THE DRAWINGS

FIG. 1 is an isometric view illustrating the general relationship of the various components of a conventional vehicular power steering system comprising prior art mounting and tie-rod linkage assemblies;

FIG. 2 is a sectional view of a control valve utilized in the vehicular power steering system depicted in FIG. 1;

FIGS. 5A, 5B and 5C are graphical illustrations depicting load pressure-error angle, pressure gain constant-error angle and flow constant-error angle values for a control valve utilized in the vehicular power steering system shown in FIG. 1;

FIGS. 6A, 6B and 6C are graphical illustrations depicting performance characteristics of the power steering system depicted in FIG. 1;

FIGS. 7A, 7B and 7C are graphical illustrations depicting performance characteristics the power steering system shown in FIG. 1 as modified by substituting a control valve having lower values for its pressure gain and flow constants;

FIGS. 19A, 19B and 19C are sectional views of either of two series damping devices depicted in FIG. 18 shown in non-deflected, compressed and stretched conditions, respectively;

FIG. 20 is a sectional view of a spring-elastomer composite utilized in the series damping device depicted in FIGS. 19A, 19B and 19C shown in an unstressed condition;

FIG. 22 is a sectional view of a series damping device utilized in a second alternative preferred embodiment of the invention;

FIGS. 24A and 24B are sectional views of a series damping device utilized in a third alternative preferred embodiment of the invention:

FIGS. 25A and 25B are graphical illustrations depicting load-deflection and spring stiffness values utilized in the series damping device of FIGS. 24A and 24B:

FIG. 28A is an isometric view of a power steering system comprising a fourth alternative preferred embodiment of the invention;

FIG. 28B is an enlarged portion of FIG. 28A;

FIG. 29 is a sectional view of a series damping device utilized in the power steering system depicted in FIGS. 28A and 28B;

PREFERRED EMBODIMENTS OF THE INVENTION

Figures 3, 4:
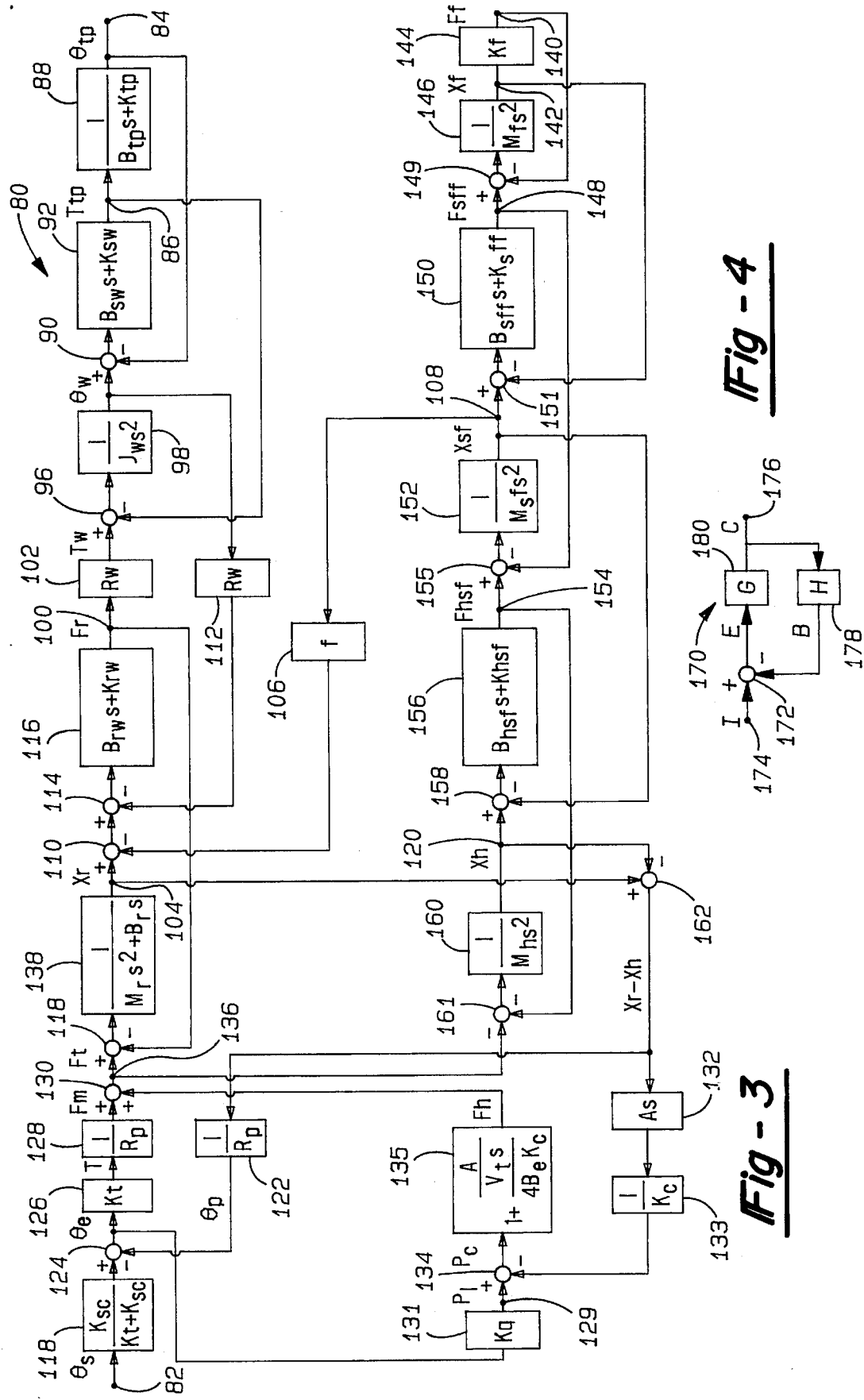
FIG. 3 is a block diagram depicting a complete vehicular power steering system.
FIG. 4 is a "canonical form" of the block diagram shown in FIG. 3.

With reference to FIG. 1, a conventional rack-and-pinion equipped power steering system 10 of a type commonly used in motor vehicles is shown. In operation, the operator of the motor vehicle applies torque to steering wheel 12 in order to establish an input steering angle $0s$. A nearly identical steering angle is transmitted to an input shaft 14 of a power steering unit 16 via steering shaft 18 and intermediate shaft 20. Steering shaft 18, intermediate shaft 20 and input shaft 14 are interconnected by universal joints 22 and 24, respectively. Power steering unit 16 typically includes control valve 26, a steering gear assembly 28 and a power cylinder 30. Power cylinder 30 is usually configured as a double-acting cylinder comprising a cylinder portion of housing 32 and a piston-and-rack assembly 34. The piston-and-rack assembly 34 provides steering force as the sum of mechanically derived force from the steering gear assembly 28 and hydraulically derived force from the power cylinder 30.

Hydraulic flow is supplied to control valve 26 at a nominally constant flow rate by a pump assembly 36. Pump assembly 36 is usually driven by the vehicle's engine (not shown) via a belt and pulley assembly 38. When pump assembly 36 is directly coupled to the engine, and further, when it includes a fixed displacement pump 40, the flow rate of the output fluid flowing from fixed displacement pump 40 varies with engine speed.

As described above, a six cylinder engine operated at idle speed may have a firing frequency of about 33 Hz with an associated rotational speed ripple of approximately 10% from peak-to-peak. When operated in a parking mode, power steering unit 16 is under maximum load. At maximum load, control valve 26 is internally deflected such that it significantly restricts the hydraulic flow from pump assembly 36 in order to concomitantly develop maximum values of pump output pressure. When control valve 26 is so deflected, pump output pressure is coupled to piston-and-rack assembly 34 in a substantially direct manner via left and right hydraulic lines 42a and 42b, respectively. Since the pump output pressure is generated by a combination of closing variable flow control orifices, its value is primarily governed by the general orifice flow equation $$Q=C_d A(2P/\rho)^{0.5}$$

where Q is flow through control valve 26, the product $(C_d A)$ is net effective valve orifice area, $\rho$ is fluid density and P is pump output pressure. As a result, pump output pressure is proportional to the square of hydraulic flow and is thus subject to an approximate 20% peak-to-peak variation at about 33 Hz.

At higher engine speeds hydraulic flow values in excess of system requirements are delivered by pump 40. In this case, a portion of the output fluid flow is then selectively bypassed to a reservoir 44 by a flow regulating bypass assembly 46 and the remaining fluid flow is delivered to control valve 26 via supply line 27 as its input fluid flow. (I.e., see a description of such power steering pumping systems in *Mark's Handbook for Mechanical Engineers*.)

In operation, steering motion and force are applied to dirigible wheels 48a and 48b by power steering unit 16 via tie-rod linkage assemblies 50a and 50b including steering knuckles 52a and 52b. Steering motion and force are then conveyed to tire patches 54a and 54b via tire side walls 56a and 56b. At the same time, equal and opposite reaction forces are applied to sub-frame 58 from housing 32 via mounting bracket 60 and bolts 62. The reaction forces are, in turn, applied to the host vehicle's frame (not shown) via mounting pads 64.

In general, the mass of piston-and-rack assembly 34, transmissive character of tie-rod linkage assemblies 50a and 50b, mass of dirigible wheels 48a and 48b, transmissive character of tire side walls 56a and 56b and tire patches 54a and 54b, mass of housing 32, transmissive character of mounting bracket 60 and bolts 62, effective mass of sub-frame 58, effective transmissive character of the interface between sub-frame 58 and the host vehicle's frame, and effective mass of the host vehicle's frame are comprised in a very complex sub-system. The dynamics associated with this sub-system heavily influence the stability criteria governing the shudder susceptibility of power steering system 10.

With reference now to FIG. 2, a sectional view of control valve 26 is shown. In general, the source of steering motion is the algebraic sum of lateral motions of piston-and-rack assembly 34 and housing 32. The algebraic sum of the lateral motions of piston-and-rack assembly 34 and housing 32 is monitored within control valve 26 via pinion and rack members 66 and 68, respectively, of steering gear assembly 28. Similarly, the deflection of control valve 26 is the algebraic sum of rotational motions of input shaft 14 and valve sleeve 70. Because valve sleeve 70 is mechanically linked to pinion 66 by pin 72, rotational motions of valve sleeve 70 substantially mimic rotational motions of pinion 66. And, input shaft 14 is compliantly coupled to pinion 66 by torsion bar 74. Thus, "follow along" position feedback between piston-and-rack assembly 34 and input shaft 14 is effected via rack 68, pinion 66 and torsion bar 74. Application of torque to input shaft 14 results in application of mechanically derived force to piston-and-rack assembly 34 via steering gear assembly 28. It also results in deflection of control valve 26 which, in turn, results in the application of hydraulically derived force to piston-and-rack assembly 34 via power cylinder 30.

With reference now to FIG. 3, a block diagram 80 which enables detailed mathematical analysis of power steering system 10 is shown. Block diagram 80 depicts a logical arrangement of all of the above mentioned mechanical and hydro-mechanical components which control dynamic linkage between input steering angle, $\theta_s$, located at input terminal 82 and output tire patch steering angle, $\theta_{tp}$, located at output terminal 84. $\theta_{tp}$ is determined by the sum of torques applied to the tire patches, $T_{tp}$, (located at terminal 86), multiplied by control element $1/(B_{tp} s+K_{tp})$ (where $K_{tp}$ and $B_{tp}$ are exemplary torsional stiffness and damping coefficient terms, respectively, determined experimentally during tire testing, and s is the Laplace variable) shown at block 88. $T_{tp}$ is determined by the difference between average dirigible wheel angle, $\theta_w$, and $\theta_{tp}$ (which difference is achieved via summing point 90) multiplied by control element $(B_{sw} s+K_{sw})$ (where $K_{sw}$ and $B_{sw}$ are torsional stiffness and torsional damping coefficient associated with torsional deflection of the tire patch with respect to dirigible wheels 48a and 48b, respectively) shown at block 92. $\theta_w$ is determined by the difference between the sum of the torques applied to the dirigible wheels 48a and 48b, $T_w$, and $T_{tp}$ (which difference is achieved via summing point 96), multiplied by control element $1/(J_w s^2)$ (where $J_w$ is moment of inertia of the dirigible wheels 48a and 48b) shown at block 98. $T_w$ is determined by the sum of the forces applied to effective steering linkage radius, $F_r$, (located at terminal 100), multiplied by control element $R_w$ (where $R_w$ is effective steering linkage radius of steering knuckles 52a and 52b) shown at block 102. $F_r$ is determined by the difference between algebraic sum $(X_r - f X_{sf})$ (where $X_r$ is lateral motion of piston-and-rack assembly 34 located at terminal 104, f is a coupling factor between sub-frame 58 and dirigible wheels 48a and 48b shown at block 106 and $X_{sf}$ is lateral motion of sub-frame 58 located at terminal 108 and the algebraic sum is achieved via summing point 110) and $\theta_w$ multiplied by another control element $R_w$ shown at block 112 (which difference is achieved via summing point 114) multiplied by control element $(B_{rw} s+K_{rw})$ (where $K_{rw}$ is the overall transverse stiffness of tie-rod linkage assemblies 50a and 50b and $B_{rw}$ is the overall series damping coefficient associated with any elastomeric elements comprised therein) shown at block 116.

The principle function of the elements represented by the remaining portions of block diagram 80 is to determine algebraic sum $(X_r - f X_{sf})$. This cannot be done independently from the elements described above because $F_r$ is fed back from terminal 100 to a summing point 118 not located within the portions of block diagram 80 so far described.

As mentioned above, inputs to block diagram 80 are made at input terminal 82 by applying input steering angle, $\theta_s$, to steering wheel 12. Control element $K_{sc}/(K_t+K_{sc})$ (where $K_{sc}$ is the combined stiffness of steering shaft 18, intermediate shaft 20, and universal joints 22 and 24, and Kt is the stiffness of torsion bar 74) shown at block 118 selects the fractional portion of $\theta_s$ actually applied to input shaft 14. The product of the algebraic sum $(X_r-X_h)$ (where $X_h$ is lateral motion of housing 32 and is located at terminal 120) and control element $1/R_p$ (where $R_p$ is radius of pinion 66 and is shown at block 122 ) determines rotational feedback angle $\theta_p$. The difference between $\theta_s$ and $\theta_p$, which difference is generated by summing point 124, generates system input error angle, $\theta_e$. The product of $\theta_e$, control element $K_t$ shown at block 126, and another control element $1/R_p$ shown at block 128 generates the mechanically derived force $F_m$ applied positively to summing point 130. Concomitantly, the difference between nominal static load pressure, $P_L$, as determined by the product of $\theta_e$ and control element $K_q$ (valve pressure gain constant to be defined below and shown at block 131) and located at terminal 129, and the product of $(X_r-X_h)$, control element (A s) (product of the area associated with power cylinder 30 and s) shown at block 132, and control element $1/K_c$ (where $K_c$ is valve flow constant also to be defined below) shown at block 133 generates low frequency dynamic cylinder pressure, $P_c$, emanating from summing point 134. The product of $P_c$ and control element $A/(1+(V_t \ s/(4 \ B_e \ K_c)))$ shown at block 135 generates the hydraulically derived force $F_h$ which is also applied positively to summing point 130. The sum of $F_m$ and $F_h$ generates total force, $F_t$, located at terminal 136 which is applied to summing point 118. And, the product of control element $1/(M_r \ s^2+B_r \ s)$ (where $M_r$ is the mass of piston-and-rack assembly 34 and $B_r$ is a parallel damping coefficient term associated with motion thereof) shown at block 138, and algebraic sum $(F_t-F_r)$ which is generated by summing point 118 generates $X_r$.

The remaining portion of block diagram 80 is a model of structural elements disposed in the path of reaction forces applied to housing 32 by power cylinder 30. Ultimately, these reaction forces are applied to a substantially "stationary" portion of the host vehicle's frame as frame force, $F_f$, located at terminal 140. $F_f$ is determined by the product of displacement of a "mobile" portion of the host vehicle's frame, $X_f$, located at terminal 142 and control element $K_f$ (where $K_f$ is a stiffness factor separating "mobile" and "stationary" portions of the host vehicle's frame) shown at block 144. $X_f$ is determined by the product of control element $1/(M_f s^2)$ (where $M_f$ is mass of the "mobile" portion of the host vehicle's frame) shown at block 146, and algebraic sum $(F_{sff}-F_f)$ (where $F_{sff}$ is force applied to "mobile" portion of the host vehicle's frame as sub-frame to frame force located at terminal 148) generated by summing point 149. $F_{sff}$ is determined by the product of control element $(B_{sff} s+K_{sff})$ (where $K_{sff}$ and $B_{sff}$ are stiffness and series damping coefficient terms, respectively, associated with the interface between sub-frame 58 and "mobile" portion of the host vehicle's frame) shown at block 150, and algebraic sum $(X_{sf}-X_f)$ generated by summing point 151. $X_{sf}$ is determined by the product of control element $1/(M_{sf} s^2)$ (where $M_{sf}$ is mass of sub-frame 58) shown at block 152, and algebraic sum $(F_{hsf}-F_{sff})$ (where $F_{hsf}$ is force applied to sub-frame 58 as housing to sub-frame force located at terminal 154) generated by summing point 155. $F_{hsf}$ is determined by the product of control element $(B_{hsf} s+K_{hsf})$ (where $K_{hsf}$ and $B_{hsf}$ are stiffness and series damping coefficient terms, respectively, associated with the interface between housing 32 and sub-frame 58) shown at block 156, and algebraic sum $(X_h-X_{sf})$ generated by summing point 158. $X_h$ is determined by the product of control element $1/(M_h \ s^2)$ (where $M_h$ is mass of housing 32) shown at block 160, and algebraic sum $(-F_t-F_{hsf})$ generated by summing point 161 (where $F_t$ is negative force applied to housing 32 because it is a reaction force as defined above). Finally, the algebraic sum $(X_r-X_h)$ is generated by summing point 162.

With reference now to FIG. 4, a "canonical form" block diagram 170 representing block diagram 80 in simplified form is shown. Block diagram 80 can be reduced to this format via computation of suitable forward and feedback transfer functions G and H, respectively, via methods described by DiStefano, Stubberud, and Williams in *Schaum's Outline of Theory and Problems of Feedback and Control Systems*. In block diagram 170 an input signal, I (equal in this case to $\theta_s$), is positively applied to summing point 172 via input terminal 174. Closed-loop response of block diagram 170 yields an output signal, C (equal in this case to $\theta_{tp}$), at output terminal 176. C multiplied by control element feedback transfer function H shown at block 178 generates a feedback signal, B, which is negatively applied to summing point 172 to generate an error signal, E. Finally, E multiplied by control element forward transfer function G shown at block 180 generates output signal C. In this case the expression for forward transfer function G is very complex. However, feedback transfer function H has the simple value $R_w/R_p$, the nominal overall steering ratio of the host vehicle. In any case, the equation $$C/I=\theta_{tp}/\theta_s=G/(1+(G \ H))$$

determines the dynamic relationship between $\theta_{tp}$ and $\theta_s$. This relationship can be normalized by multiplying by H to form the term $(G \ H)/(1+(G \ H))$.

It is desirable for any servo system, as represented by block diagram 170, to operate in a stable manner. This will occur if the open-loop transfer function, (G H), attains sufficient values of gain margin wherein its absolute value differs sufficiently from a value of 1.0 whenever its argument attains an angular value equal to an odd multiple of 180 degrees, and sufficient values of phase margin wherein its argument differs sufficiently from a value equal to an odd multiple of 180 degrees whenever its absolute value attains a value of 1.0. A practical feeling for these factors is illustrated by the following example:

With reference to FIGS. 5A, 5B and 5C, load pressure-$\theta_e$, $K_q-\theta_e$ and $K-\theta_e$ curves 182, 184 and 186, respectively, for a control valve having nominal performance values are shown where load pressure-$\theta_e$ curve 182 depicts the relationship between load pressure, $P_L$, and error angle, $\theta_e$, $K_q-\theta_e$ curve 184 depicts the relationship between valve pressure gain constant, $K_q$, and error angle, $\theta_e$, and $K_c-\theta_e$ curve 186 depicts the relationship between valve flow constant, $K_c$, and error angle, $\theta_e$. Values of $K_q$ and $K_c$ are determined as follows: The pressure gain constant, $K_q$, is equal in value to the slope of the load pressure-$\theta_e$ curve 182, and the valve flow constant, $K_c$, is equal in value to the negative reciprocal of the rate of change of load pressure, $P_L$, with respect to load flow, $Q_L$, which is equal in value to the product $(X_r \ A \ s)$. These curves are used to determine appropriate values of $K_q$ and $K_c$ for use in any particular stability calculation. Stability problems are usually encountered during parking maneuvers where $P_L$ attains relatively high values. Entering curve 182 with a $P_L$ value of 1,200 psi yields a corresponding value for $\theta_e$ of 0.053 radians. Entering curves 184 and 186 with this value yields corresponding values of 175,000 psi/radian and 0.018 (in$^3$/second)/psi for $K_q$ and $K_c$, respectively.

With reference to FIGS. 6A, 6B and 6C, normalized gain (i.e., the term (G H)/(1+(G H))), Log[Abs[(G H)]] and Arg[(G H)] curves 188, 190 and 192, respectively, for the above determined values for $K_q$ and $K_c$ and the following values: for the various other constants are shown:

$K_{tp}$=150 in.lb/rad.
$B_{tp}$=250 in.lb.sec/rad.
$K_{sw}$=25,000 in.lb/rad.
$B_{sw}$=30 in.lb.sec/rad.
$J_w$=5 in.lb.sec$^2$/rad.
$R_w$=5 in/rad.
$K_{rw}$=10,000 lb/in.
$B_{rw}$=0.3 lb.sec/in.
$M_r$=0.02 lb.sec$^2$/in.
$B_r$=0.0 lb.sec/in.
$R_p$=0.3127 in.
$K_t$=585 in.lb/rad.
$K_{sc}$=1,500 in.lb/rad.
f=0.8
A=1.3 in$^2$
$V_t$=9.1 in$^3$
$B_e$=100,000 psi
$M_h$=0.02 lb.sec$^2$/in.
$K_{hsf}$=15,000 lb/in.
$B_{hsf}$=0.0 lb.sec/in.
$M_{sf}$=0.12 lb.sec$^2$/in.
$K_{sff}$=60,000 lb/in.
$B_{sff}$=0.0 lb.sec/in.
$M_f$=0.2 lb.sec$^2$/in. and
$K_f$=53,000 lb/in.

Curves 188, 190 and 192 were plotted with *Mathematica* (a software program available from Wolfram Research of Champaign, Ill.) using 250 data points for each curve. Since Mathematica can not tell the difference between angular values separated by integral multiples of 360 degrees, it plots values smaller than −180 degrees as angles smaller than +180 degrees etc. Thus, there is a jump in curve 192 every time it crosses an odd multiple of 180 degrees. The lagging phase angle associated with first peak 194 (at about 30 Hz) of curve 188 is −180 degrees while the lagging phase angle associated with third peak 196 (at about 63 Hz) is −540 degrees. It can be seen that the resonance depicted by third peak 196 is very sharp. This is especially significant because very small changes in the (G H) value (i.e., gain margin) could make its value infinite and it would then be subject to self excitation. This is indeed the case as the vehicle modeled by the above listed values exhibits intermittent self excited shudder at 63 Hz. On the other hand, it can also be seen that the band of increased gain highlighted by first and second peaks 194 and 198, respectively, is quite broad. Thus, any relevant perturbation such as the pump output pressure variation of about 20% peak-to-peak centered at 33 Hz mentioned above will be amplified. Furthermore, the presence of the two juxtaposed resonant frequencies causes the amplification to be non-linear with the result that the main shudder component comprises an otherwise unexpectedly high harmonic content.

As noted above, reducing control valve gain (i.e., $K_q$) is thought to enhance system stability. Similarly, reduction of valve flow constant, $K_c$ should also be beneficial because the algebraic summing action of summing point 134 results in a decrease in the value of $P_c$ due to corresponding decreasing values of the term $-(X_r A s)/K_c$. With reference to FIGS. 7A, 7B and 7C, (G H)/(1+(G H)), Log[Abs[(G H)]] and Arg[(G H)] curves 200, 202 and 204, respectively, are shown wherein values of $K_q$=87,500 psi/rad. and $K_c$=0.0045 (in$^3$/second)/psi have been substituted for the above mentioned values therefor of 175,000 psi/radian and 0.018 (in$^3$/second)/psi, respectively. While second and third peaks 206 and 208 have been somewhat reduced, first peak 210 is actually slightly higher. This is due to similarly minimal gain and phase margins as depicted by curves 202 and 204 and, at least for the modeled vehicle, is clearly an unacceptable solution to the shudder problem.

Figure 8:
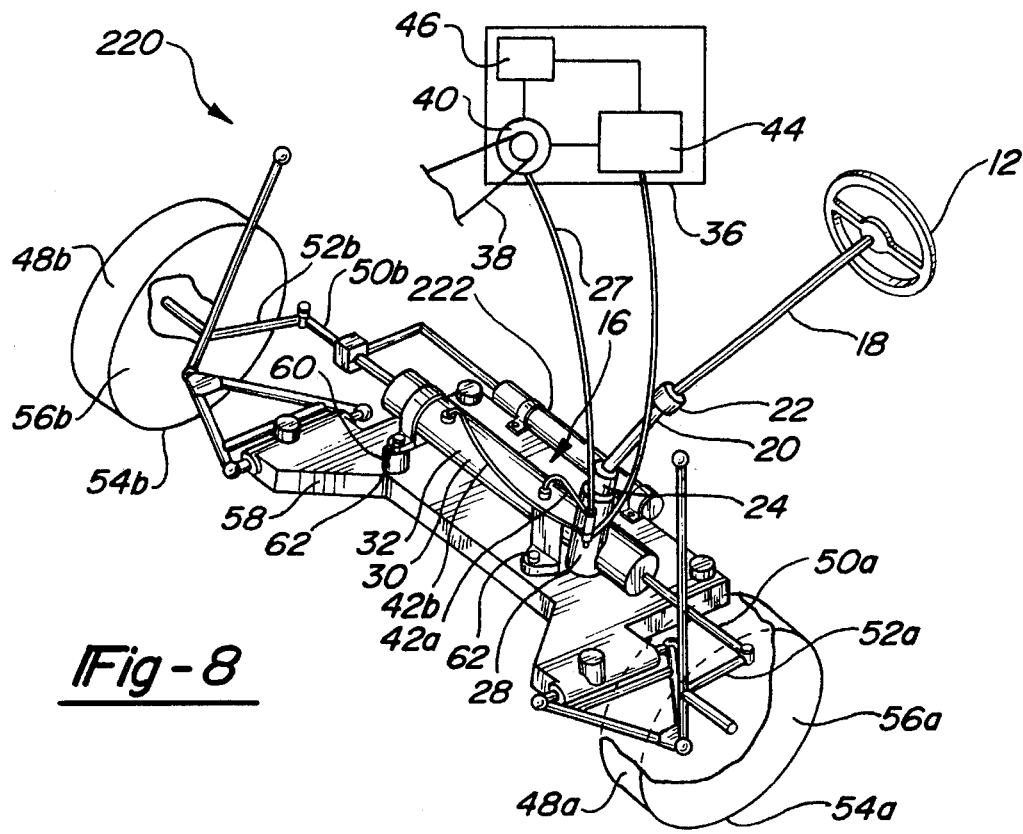
FIG. 8 is an isometric view illustrating another conventional power steering system which additionally comprises a supplemental motion control damper.
Figure 9A:
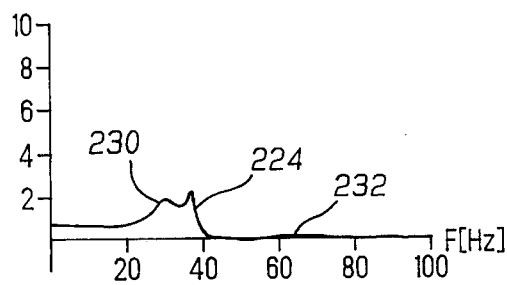
FIGS. 9A, 9B and 9C are graphical illustrations depicting performance characteristics of the power steering system depicted in FIG. 8.
Figure 9B:
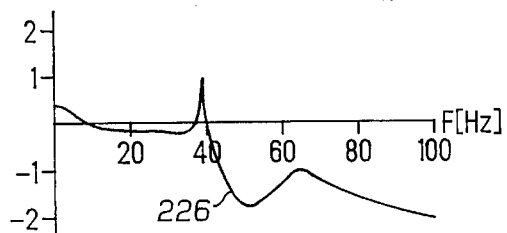
Figure 9C:
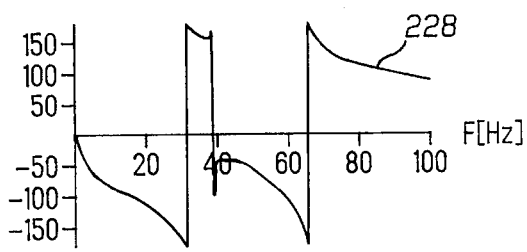

With reference to FIG. 8, another prior art power steering system 220 which comprises all of the components of the power steering system of FIG. 1 and additionally comprises a supplemental motion control damper 222 is shown. As such, like reference numerals are used in both FIGS. 1 and 8 to identify like components. Stability criterion for power steering system 220 is accomplished by substituting a non-zero value for $B_r$ to account for the inclusion of supplemental motion control damper 222. In order to provide a maximum improvement in stability, it is desirable to utilize the largest value for $B_r$ that is practical. With reference to FIGS. 9A, 9B and 9C, (G H)/(1+(G H)), Log[Abs[(G H)]] and Arg[(G H)] curves 224, 226 and 228, respectively, are shown wherein a value of $B_r$=25 lb.sec/in. has been substituted for the above listed value therefor of 0.0 lb.sec/in. This value results in a steering wheel rotational damping factor, $B_s$=$B_r/R_p^2$=2.44 in.lb.sec/rad., whereby an additional 24.4 in.lb. of applied torque would be required to rotate the steering wheel at 10 rad/sec. Curve 224 depicts greatly improved stability wherein first and third peaks 230 and 232 are significantly reduced. However, in addition to the increased steering efforts with respect to steering motion, such supplemental motion control dampers generally take the form of gas-filled shock absorbers which are relatively expensive and difficult to mount. Thus, they are usually added to vehicular power steering systems only as a last resort.

Figure 10A:
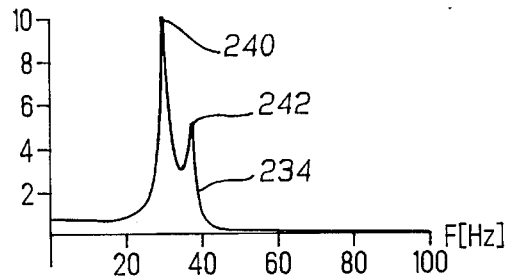
FIGS. 10A, 10B and 10C are graphical illustrations depicting performance characteristics of a power steering system comprising a sub-frame to frame mounting comprising "lossy compliance"
Figure 10B:
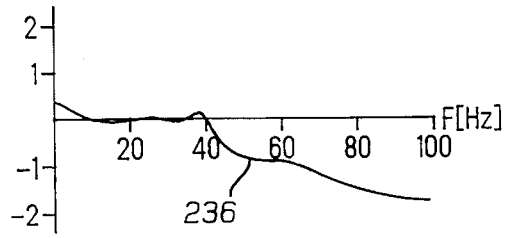
Figure 10C:
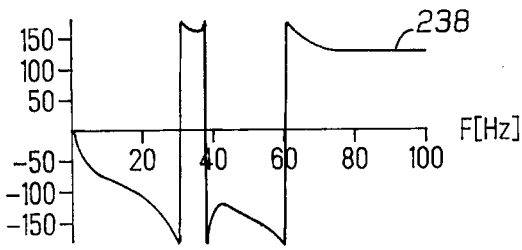

Supplemental motion control dampers having significant values of damping coefficient, $B_r$, add to steering effort because they are parallel elements that must be deflected concomitantly with steering wheel rotation. On the other hand, series damping devices, such as selectively compliant devices comprising "lossy" elements, utilized with tie-rod linkage assemblies 50a and 50b, the interface between sub-frame 58 and the "mobile" portion of the host vehicle's frame, and the interface between housing 32 and sub-frame 58 depicted in block diagram 80 by $B_{rw}$, $B_{hsf}$ and $B_{sff}$, respectively, can provide damping without increasing steering effort. Of these, a series damping element introduced between sub-frame 58 and the "mobile" portion of the host vehicle's frame is substantially ineffective in improving stability as evidenced with reference to FIG. 10A, 10B and 10C, wherein (G H)/(1+(G H)), Log[Abs[(G H)]] and Arg [(G H)] curves 234, 236 and 238, respectively, are shown. In this case, values of $B_{sff}$=50 lb.sec/in. and $K_{sff}$=15,000 lb/in. have been substituted for the above listed values therefor of 0.0 lb.sec/in. and 60,000 lb/in., respectively. In this case the third peak has been substantially eliminated but first and second peaks 240 and 242, respectively, have been made considerably worse with first peak 240 representing a self excited resonance.

Figure 11:
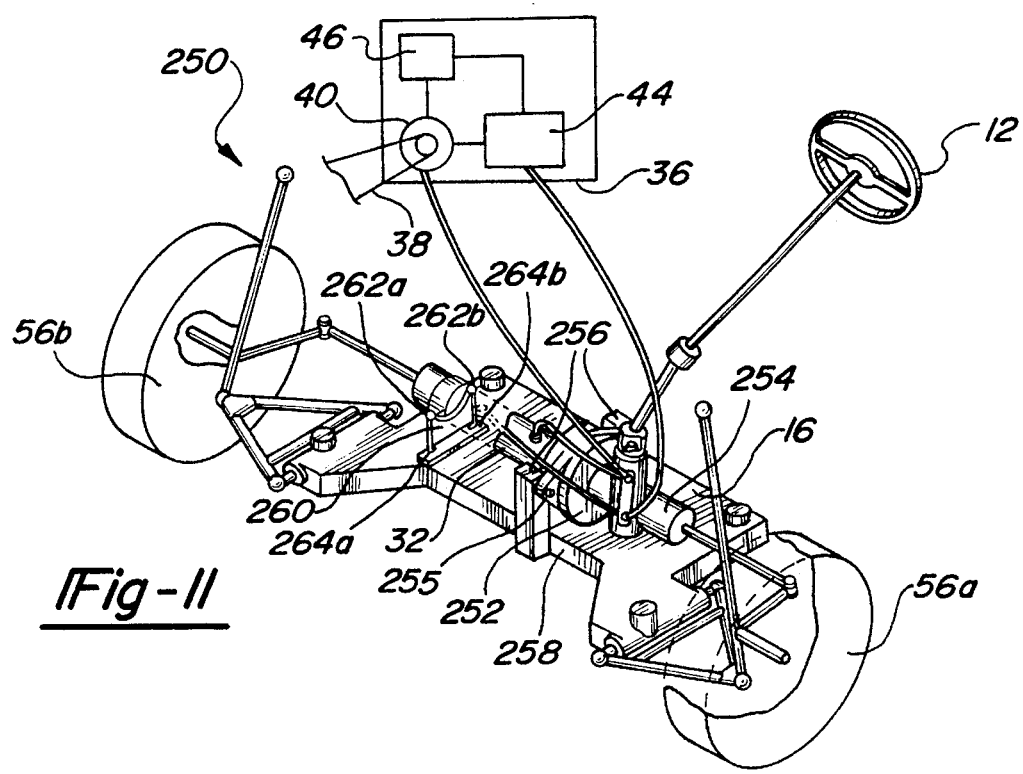
FIG. 11 is an isometric view of a power steering system comprising a preferred embodiment of a series damping device of the invention.
Figure 12A:
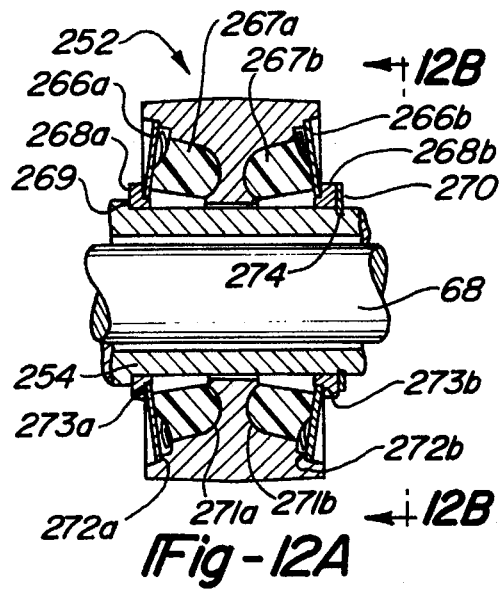
FIGS. 12A and 12B are sectional views of the series damping device utilized in the power steering system depicted in FIG. 11.
Figure 12B:
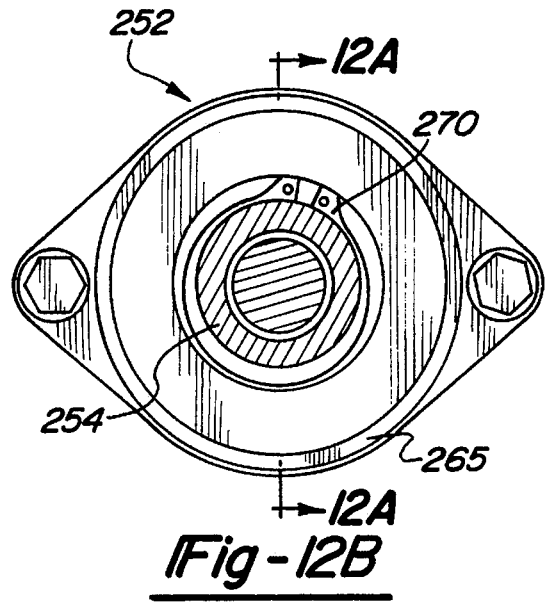

A preferred embodiment of the invention is shown in FIGS. 11, 12A and 12B, wherein a power steering system 250 additionally comprises a series damping device 252. Power steering system 250 also comprises most of the components of the power steering system of FIG. 1. As such, like reference numerals are used in both FIGS. 1 and 11 to identify like components. Series damping device 252 is utilized in power steering system 250 to provide selected values of damped axial compliance between housing 32 and sub-frame 258. With particular reference to FIG. 11, it can be seen that series damping device 252 is mounted to brackets 256 via bolts 255 whereby it also locates housing 254 in lateral and vertical directions with respect to sub-frame 258 at a plane comprising the interface between series damping device 252 and brackets 256. In addition, housing 254 is located in pitch, roll and yaw via double hinge 260 which interfaces with housing 254 at pivots 262a and 262b, and sub-frame 258 at pivots 264a and 264b. It will be appreciated that double hinge 260 is merely an exemplary supplemental mounting device utilized for the purpose of suitably locating housing 254 with respect to the pitch, roll and yaw directions and is not intended to limit the scope of the present invention.

With particular reference now to FIGS. 12A and 12B, series damping device 252 is a selectively compliant "lossy" device comprising a housing 265 which is compliantly located with respect to housing 254 via Belleville spring washers 266a and 266b, elastomeric bumpers 267a and 267b, mounting rings 268a and 268b, shoulder 269 and retaining ring 270. One convenient way to form elastomeric bumpers 267a and 267b is to coat curvilinear surfaces 271a and 271b with a bonding agent and form elastomeric bumpers 267a and 267b directly with housing 265 in a conjoined assembly via a molding operation. Belleville spring washers 266a and 266b are retained against shoulders 272a and 272b formed in housing 265, and shoulders 273a and 273b formed on mounting rings 268a and 268b, respectively, in a slightly preloaded manner via design choice in positioning groove 274 for retaining ring 270. Belleville spring washers 266a and 266b are configured as non-linear springs having a high initial spring constant. In general, Belleville spring washers are designed according to load formula $$P = (4 E/(1-\mu^2)) (t f/(\alpha D^2)) ((f_{max}-f) (f_{max}-f/2)+t^2)$$

where P is applied load, E is modulus of elasticity, $\mu$ is Poisson's ratio, f is spring deflection, $\alpha$ is a coefficient depending upon the ratio of washer o.d. to i.d., D/d, according to Table 1 shown below, D is washer o.d., d is washer i.d., $f_{max}$ is the spring deflection value required to flatten and t is material thickness. Table 1 is as follows:

TABLE 1

| D/d | α | D/d | α |
|---|---|---|---|
| 1.2 | 0.291 | 2.0 | 0.694 |
| 1.3 | 0.388 | 2.1 | 0.713 |
| 1.4 | 0.464 | 2.2 | 0.728 |
| 1.5 | 0.525 | 2.3 | 0.741 |
| 1.6 | 0.574 | 2.4 | 0.752 |
| 1.7 | 0.613 | 2.5 | 0.761 |
| 1.8 | 0.646 | 2.6 | 0.768 |
| 1.9 | 0.672 | 2.7 | 0.775 |

Figure 13A:
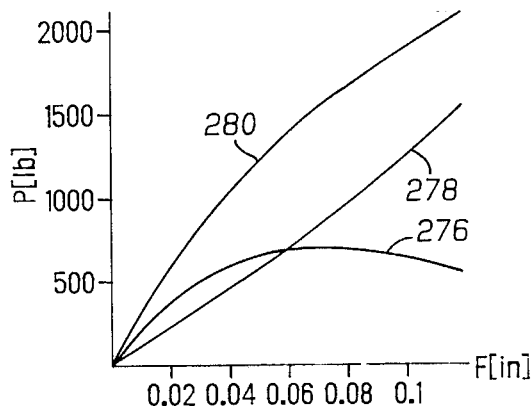
FIGS. 13A and 13B are graphical illustrations depicting load-deflection and spring stiffness values utilized in the series damping device depicted in FIGS. 12A and 12B.
Figure 13B:
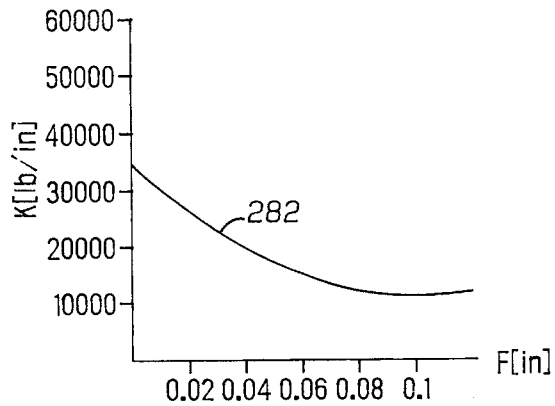

With reference to FIG. 13A, curves 276, 278 and 280 depict load-deflection values for either of Belleville spring washers 266a or 266b, either of elastomeric bumpers 267a or 267b, and series damping device 252 as a whole in either direction, respectively. In order to achieve the highly non-linear contour of curve 276, Belleville spring washers 266a and 266b are configured with $f_{max}$ equal to approximately twice material thickness, t. With reference to FIG. 13B, curve 282 depicts resulting values of spring stiffness for series damping device 252 as deflected in either direction.

Figures 14A, 14B:
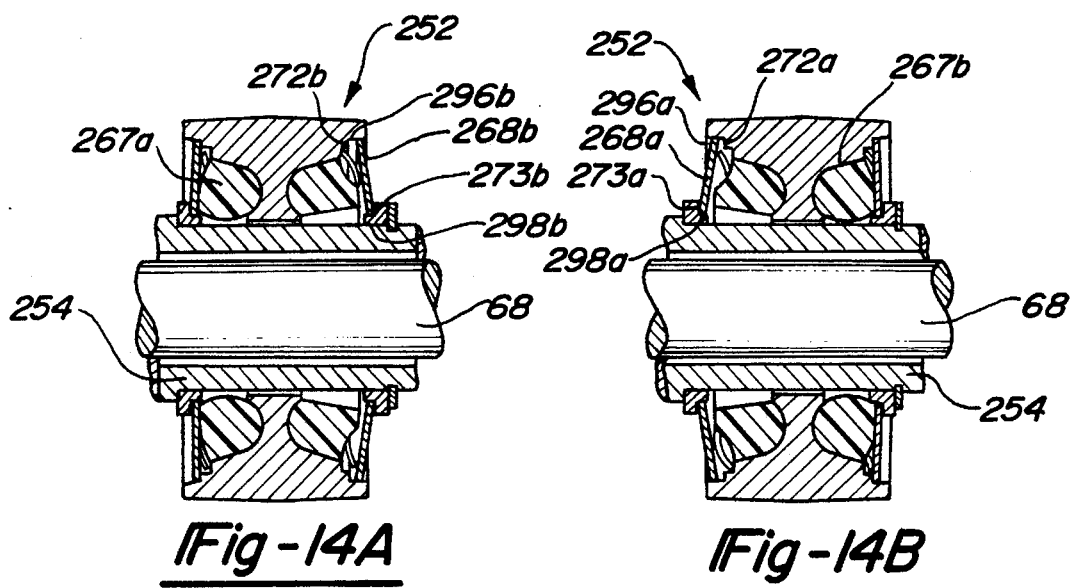
FIGS. 14A and 14B are sectional views of the series damping device depicted in FIGS. 12A and 12B showing the series damping device deflected in left and right directions, respectively.
Figure 15A:
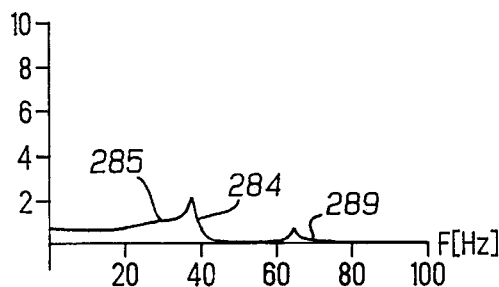
FIGS. 15A, 15B and 15C are graphical illustrations depicting improved performance characteristics of the power steering system depicted in FIG. 11 as attained via a method of introducing series damping in the system's mounting structure.
Figure 15B:
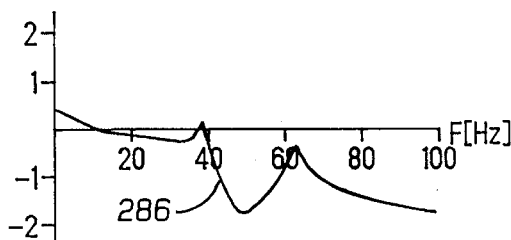
Figure 15C:
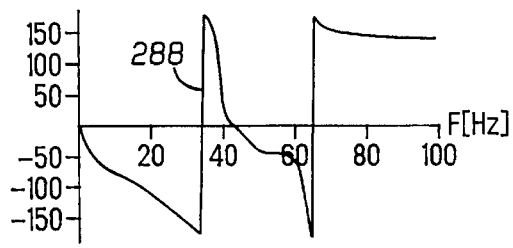

With reference to FIGS. 14A and 14B, series damping device 252 is shown deflected in left and right directions, respectively. As series damping device 252 undergoes deflection, one of elastomeric bumpers 267a or 267b both deflects and deforms elastomerically to both provide load-deflection characteristics as depicted by curve 278 and damping coefficient values of approximately 50 lb.sec/in. These spring rate and damping coefficient values are utilized in conjunction with the previously listed housing 254 to sub-frame 258 interface stiffness value to yield values of $K_{hsf}$=7,500 lb/in. and $B_{hsf}$=50 lb.sec/in. which are substituted for the above listed values therefor of $K_{hsf}$= 15,000 lb/in. and $B_{hsf}$=0.0 lb.sec/in., respectively. With reference now to FIGS. 15A, 15B and 15C (G H)/(1+(G H)), Log [Abs[(G H)]] and Arg[(G H)] curves 284, 286 and 288, respectively, embodying these values are shown. Curve 284 depicts stability characteristics that are enhanced, even with respect to those shown in curve 224 depicting performance of power steering system 220 comprising supplemental motion control damper 222. In fact, first peak 285 is almost not present at all, and curve 288 undulations are gentle enough to clearly discern the above noted phase transition to −540 degrees at third peak 289 (of curve 284).

Figure 16:
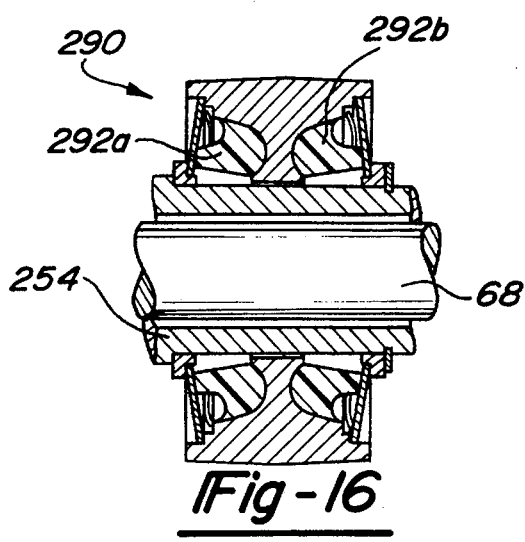
FIG. 16 is a sectional view depicting alternate preferred construction of a series damping device suitable for use in the power steering system depicted in FIG. 11.

As described above, elastomeric bumpers 267a and 267a both deflect and deform elastomerically to provide desired load-deflection and damping characteristics. This can usually be accomplished via elastomer selection. However, it is sometimes necessary to vary the physical design of the bumpers in order to achieve a desired combination of characteristics. With reference to FIG. 16, there is shown a series damping device 290 comprising elastomeric bumpers 292a and 292b having higher axial to radial thickness ratio than elastomeric bumpers 267a and 267b.

Figure 17:
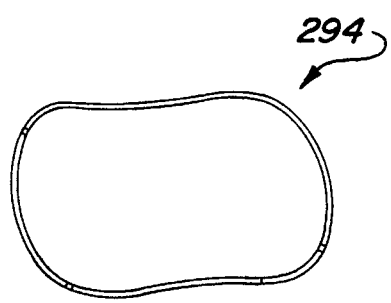
FIG. 17 is an isometric view of a wire wave washer utilized in either of the series damping devices depicted in FIGS. 12A and 12B or in FIG. 16.

With reference now to FIG. 17, there is shown a wire wave washer 294 utilized in either side of both of series damping devices 252 and 290 to retain the unstressed one of Belleville spring washers 266b or 266a in engagement with the juxtaposed one of shoulders 273b or 273a as shown particularly in FIGS. 14A and 14B, respectively. In addition, bores 296b and 296a juxtaposed to shoulders 272b and 272a, respectively, and surfaces 298b and 298a juxtaposed to shoulders 273b and 273a, respectively, are formed as conical surfaces in order to guide the unstressed one of Belleville spring washers 266b or 266a back into engagement with shoulders 272b or 272a, respectively, and surfaces 298b or 298a, respectively.

Figure 19A:
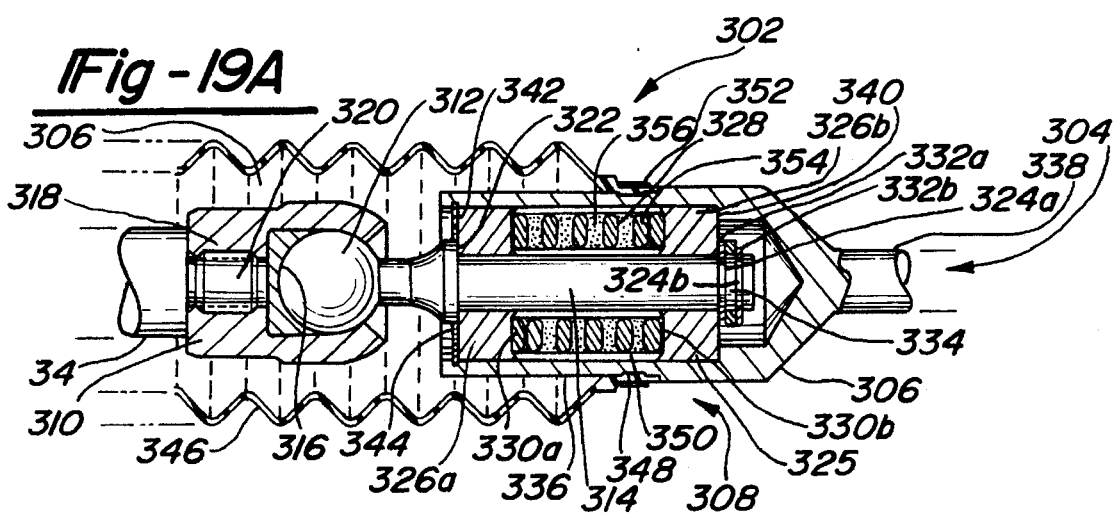
Figure 19B:
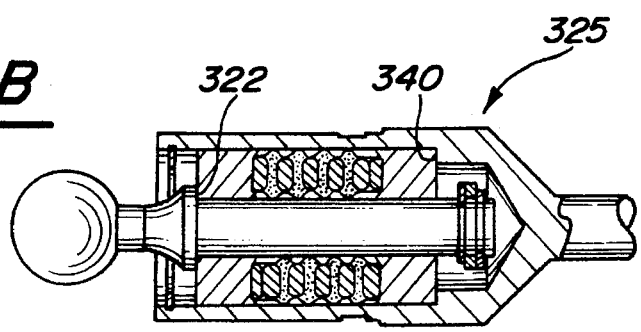

A first alternative preferred embodiment of the invention is shown in FIGS. 18, 19A, 19B and 19C, wherein a power steering system 300 additionally comprises a pair of series damping devices 302a and 302b. Power steering system 300 also comprises most of the components of power steering system 10 shown in FIG. 1. As such, like reference numerals are used in both FIGS. 1 and 18 to identify like components. Series damping devices 302a and 302b are utilized in power steering system 300 to provide selected values of damped axial compliance between piston-and-rack assembly 34 and tie-rod linkage assemblies 304a and 304b, respectively. With particular reference to FIGS. 19A, 19B and 19C, it can be seen that series damping devices 302a and 302b are actually comprised within tie-rod linkage assemblies 304a and 304b, respectively, as component portions thereof. Since series damping devices 302a and 302b are identical, further reference to them hereinunder will be to a generic series damping device 302.

Series damping device 302 is a preloaded "lossy" compliant coupling joining piston-and-rack assembly 34 and tie-rod 304 via rod-end assembly 306 and bi-constrained loading assembly 308. Rod-end assembly 306 is formed in a known manner and comprises housing 310, ball 312, rod-end shaft 314 and seat 316. Threaded bore 318 is formed in housing 310 for threadably engaging threaded boss 320 of piston-and-rack assembly 34. Rod-end shaft 314 includes shoulder 322 and retaining ring grooves 324a and 324b.

An intermediate sub-assembly 325 is formed by mounting first and second bushings 326a and 326b, respectively, upon rod-end shaft 314 with spring-elastomer composite 328 seated therebetween in annular depressions 330a and 330b. Second bushing 326b is pushed toward shoulder 322 to compress spring-elastomer composite 328 and is retained by first retaining ring 332a, spacer 334 and second retaining ring 332b wherein the retaining rings are installed in grooves 324a and 324b, respectively. Two retaining rings are utilized in order to provide an adequate strength safety factor. However, it will be appreciated that the use of the two retaining rings 332a and 323b is merely an exemplary means of retaining first bushing 326a, spring-elastomer composite 328 and second bushing 326b, and is not intended to limit the scope of the present invention.

Intermediate sub-assembly 325 is then installed within sleeve 336 portion of tie-rod 338 against shoulder 340 and retained by retaining ring 342 which is installed in groove 344. Sleeve 336 and rod-end shaft 314 are configured such that the axial distances between shoulder 340 and retaining ring 342 (as retained in groove 344), and shoulder 322 and retaining ring 332a (as retained in groove 324a) are substantially identical and result in spring-elastomer composite 328 being compressed to a length resulting in a selected preload value. Finally, boot 346 (whose other end is affixed to housing 32 (not shown)) is sealingly retained in groove 348 and against shoulder 350 in a known manner by clamping ring 352.

Spring-elastomer composite 328 is formed by a molding process wherein a standard die spring 354 is coated with a bonding agent whereupon elastomeric material 356 is formed in a conjoined assembly via a molding operation. During the molding operation, die spring 354 is usually compressed to its nominal preload length. This results in elastomeric material 356 being in a stretched condition before spring-elastomer composite 328 is compressed in intermediate sub-assembly 325 as evidenced with reference to FIG. 20, wherein spring-elastomer composite 328 is shown in its relaxed state.

In operation, spring-elastomer composite 328 is compressed whenever axial force in excess of the selected preload value is applied to series damping device 302. With particular reference to FIGS. 19B and 19C, series damping device 302 is shown in compressed and extended modes, respectively. In the compressed mode spring-elastomer composite 328 is compressed between shoulders 322 and 340 while in the extended mode it is compressed between retaining rings 324a and 342.

Figure 21A:
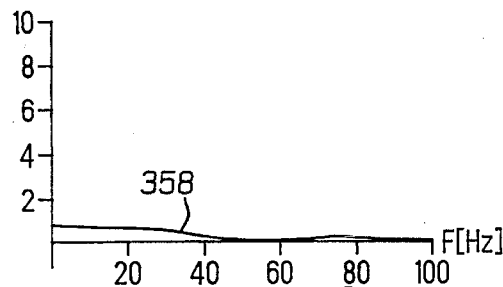
FIGS. 21A, 21B and 21C are graphical illustrations depicting improved performance characteristics of the power steering system depicted in FIG. 18 as attained via a method of introducing series damping in the system's load positioning structure.
Figure 21B:
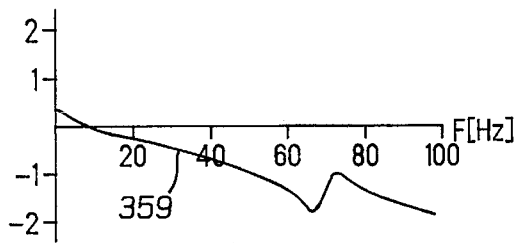
Figure 21C:
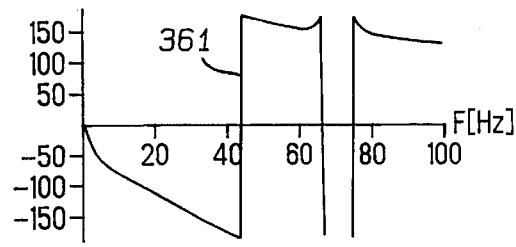

A resulting summed stiffness value of about 10,000 lb/in. (i.e., about 5,000 lb/in. for each of series damping devices 302a and 302b) and their summed damping coefficient values are used in conjunction with the previously listed overall transverse stiffness and damping coefficient values for the tie-rod linkage assemblies 50a and 50b to yield values of $K_{rw}$=5,000 lb/in. and $B_{rw}$=50 lb.sec/in., respectively, which are substituted for the above listed values therefor of $K_{rw}$=10,000 lb/in. and $B_{rw}$=0.3 lb.sec/in., respectively. With reference now to FIGS. 21A, 21B and 21C, (G H)/(1+(G H)), Log[Abs[(G H)]] and Arg[(G H)] curves 358, 359 and 361, respectively, embodying these values are shown. Curve 358 depicts stability characteristics that are spectacularly enhanced, with sizable gain and phase margins resulting in virtually no discernible resonances at all. In fact, damping is enhanced to the point where curve 362 does not achieve the previously seen lagging phase values through and exceeding −540 degrees. Rather, at 100 Hz its value is only about −230 degrees.

A second alternative preferred embodiment of the invention is shown in FIG. 22, wherein a series damping device 360 comprises first and second "lossy" spring members 362a and 362b, respectively. Series damping device 360 also comprises most of the components of series damping device 302. As such, like reference numerals are used in both FIGS. 19A and 22 to identify like components. Series damping device 360 can be utilized interchangeably (i.e., with series damping device 302) in power steering system 300 to provide selected values of damped axial compliance between piston-and-rack assembly 34 and tie-rod linkage assemblies 364a and 364b, respectively.

Intermediate sub-assembly 365 comprises first anti second bushings 366a and 366b, respectively, first and second "lossy" spring members 362a and 362b, respectively, and intermediate ring 370, and is interchanged for intermediate sub-assembly 325 to implement series damping device 360. First and second "lossy" spring members 362a and 362b, respectively, each comprise first and second Belleville spring washers 372a and 372b, respectively, which have non-linear spring characteristics similar to those of Belleville spring washers 266a and 266b described above. Belleville spring washers 372a and 372b are formed with a radially centered plurality of transverse holes 374. First and second "lossy" spring members 362a and 362b, respectively, are composite structures wherein Belleville spring washers 372a and 372b are separated by and encased in "lossy" elastomeric material 376 wherein transverse holes 374 are utilized to enhance the integrity of "lossy" elastomeric material 376. In addition, "lossy" elastomeric material 376 supplementally forms first and second bumpers 378a and 378b, respectively. Generally, first and second "lossy" spring members 362a and 362b, respectively, are mounted back-to-back and retained between shoulders 380 formed on either of bushings 366a and 366b and shoulders 382 formed on either side of intermediate ring 370. First bumpers 378a are deformably impressed upon surfaces 384 formed on either of bushings 366a and 366b while second bumpers are deformably impressed upon surfaces 386 formed on either side of intermediate ring 370.

Figure 23A:
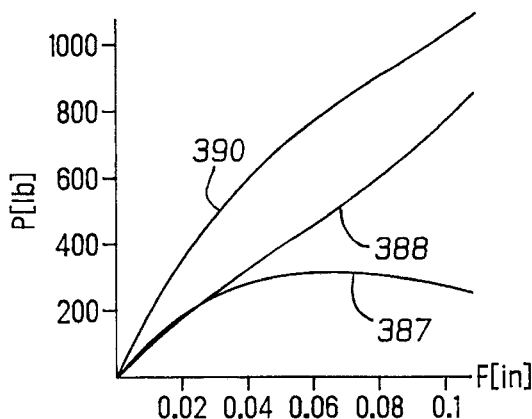
FIGS. 23A and 23B are graphical illustrations depicting load-deflection and spring stiffness values utilized in the series damping device of FIG. 22.
Figure 23B:
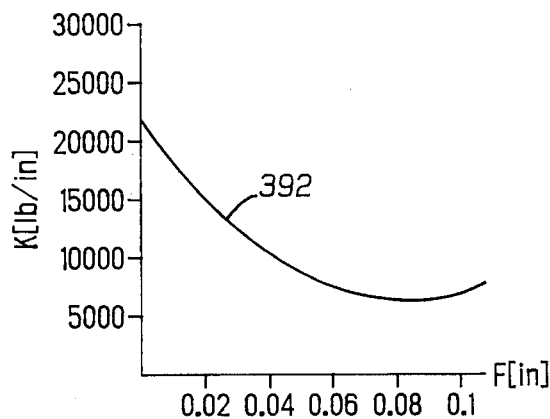
Figure 18:
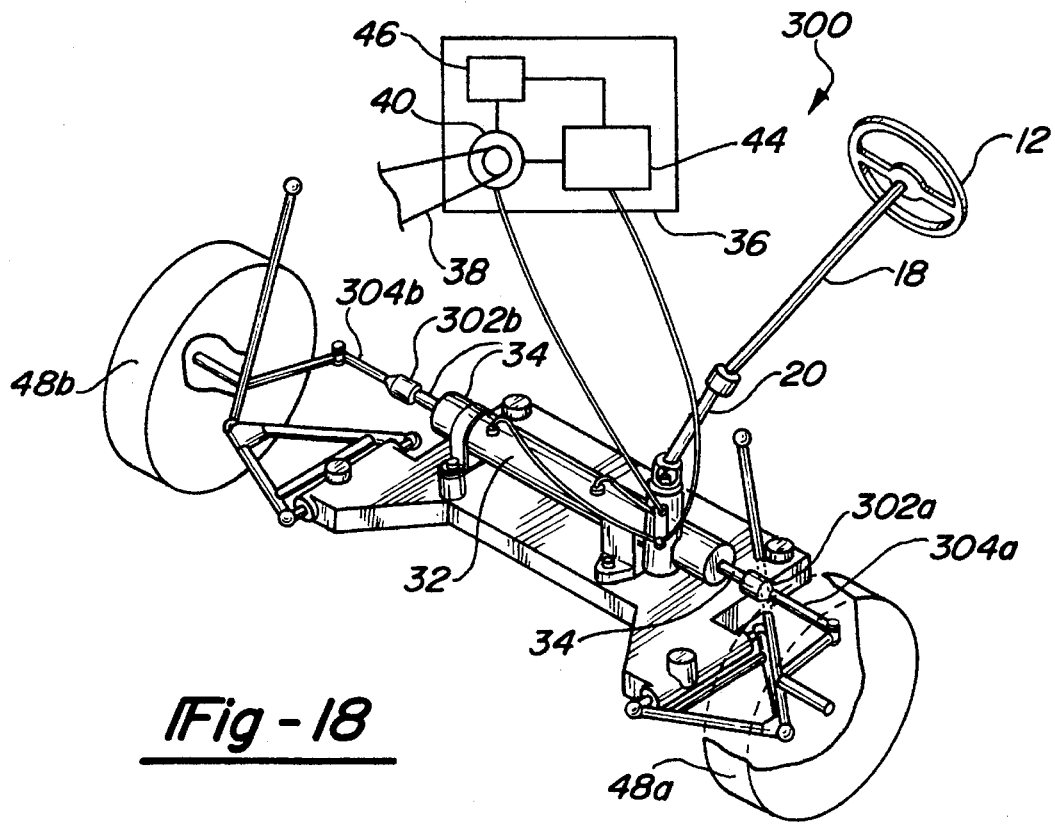
FIG. 18 is an isometric view of a power steering system comprising a first alternative preferred embodiment of the invention.

With reference to FIG. 23A, curves 387, 388 and 390 depict load-deflection values for either of Belleville spring washers 372a or 372b, either of elastomeric bumpers 378a or 378b, and either of their respective summed values. In order to achieve the highly non-linear contour of curve 387, Belleville spring washers 372a and 372b are configured with $f_{max}$ equal to approximately twice their material thickness, t. With reference to FIG. 23B, curve 392 depicts values of spring stiffness corresponding to curve 390.

Since the initial stiffness value, (i.e., twice the initial value of $K_{rw}$), of the whole assembly is twice the initial value of curve 392 or about 43,500 lb/in. which is relatively large compared to the above listed value for $K_{rw}$ of 10,000 lb/in., only incidental preloading necessary to ensure backlash free operation is required. Thus, because series damping device 360 operates most of the time under conditions of low axial force, steady-state loading is minimal. As a result of minimal preload and steady-state loading values, cold flow of "lossy"

elastomeric material 376 is minimal. However, when applied force values from either direction exceed preload value, progressive compression of spring members 362a and 362b ensues. Concomitant energy loss is effected by both compressive deformation of bumpers 378a and 378b, and shear deformation of the portion of "lossy" elastomeric material 376 located between Belleville spring washers 372a and 372b.

Figure 24B:
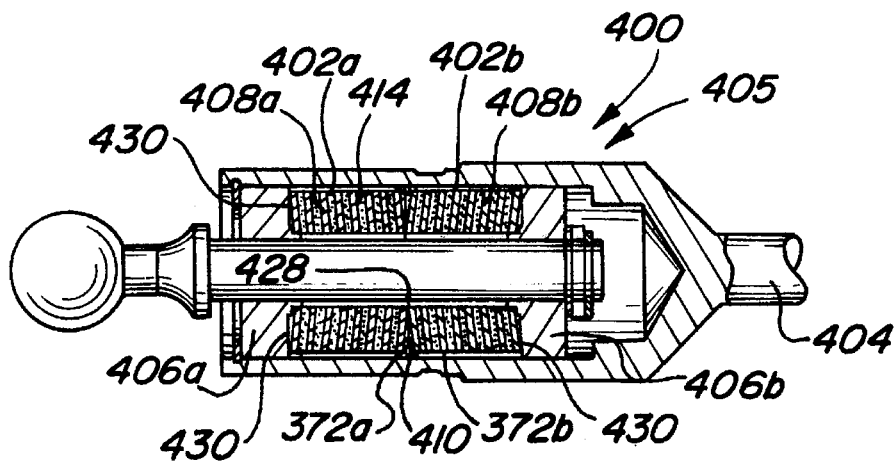

A third alternative preferred embodiment of the invention is shown in FIGS. 24A and 24B, wherein a series damping device 400 comprises first and second composite structures 402a and 402b, respectively. FIG. 24A depicts series damping device 400 in a relaxed position while FIG. 24B depicts series damping device 400 in a maximally loaded condition whereat its "lossy" spring members 408a and 408b become hyper-compressed. Series damping device 400 comprises most of the components of series damping device 302. As such, like reference numerals are used in both FIGS. 19A and 24A to identify like components. Series damping device 400 can be utilized interchangeably (i.e., with series damping device 302) in power steering system 300 to provide selected values of damped axial compliance between piston-and-rack assembly 34 and tie-rod linkage assemblies 404a and 404b, respectively.

Intermediate sub-assembly 405 comprises first and second bushings 406a and 406b, respectively, first and second "lossy" spring members 408a and 408b, respectively, and intermediate ring 410. These elements are assembled in a manner similar to that described above in intermediate sub-assembly 325 to implement series damping device 400. First and second "lossy" spring members 408a and 408b, respectively, each comprise a plurality of Belleville spring washers 412 encased in "lossy" elastomeric material 414. Generally, first and second "lossy" spring members 408a and 408b, respectively, are mounted back-to-back and retained between shoulders 416 formed on either of bushings 406a or 406b and shoulders 418 formed on either side of intermediate ring 410.

With reference to FIG. 25A, curves 420 and 422 depict load-deflection values for either of "lossy" spring members 408a or 408b, and one of Belleville spring washers 412, respectively. Belleville spring washers 412 are configured with $f_{max}$ equal to approximately 1.2 times their material thickness, t. However, in operation they are allowed to hyper-compress a distance equal to the product (1.25 $f_{max}$) or about 1.5 times their material thickness, t. Thus, their load-deflection values exhibit slope reversal at a deflection equal to $f_{max}$ as evidenced particularly with reference to FIG. 25B wherein curve 424 depicts values of spring stiffness corresponding to curve 420 and exhibits a minimum value at numerical indicator 426 at a deflection equal to $f_{max}$. However, as shown in FIG. 24B, first and second "lossy" spring members 408a and 408b, respectively, can hyper-compress into an inverted state until they touch each other as indicated at numerical indicator 428 and shoulders 430 formed on bushings 406a and 406b. This allows their maximum design load to be attained at $f_{max}$ whereat minimum spring stiffness value occurs while concomitantly providing for possible overload conditions.

Since the initial stiffness value, (i.e., twice the initial value of $K_{rw}$), of the whole assembly is twice the initial value of curve 420 or well in excess of 60,000 lb/in., only incidental preloading necessary to ensure backlash free operation is required. Thus, because series damping device 400 operates most of the time under conditions of low axial force, steady-state loading, and therefore, cold flow of "lossy" elastomeric material 414 is minimal. However, when applied force values from either direction exceed preload value, progressive compression of "lossy" spring members 408a and 408b ensues. Concomitant energy loss is effected by shear deformation of the portion of "lossy" elastomeric material 414 located between Belleville spring washers 372a and 372b.

As mentioned above, curve 424 depicts values of spring stiffness for each of "lossy" spring members 408a and 408b that vary widely from an initial value well in excess of 30,000 lb/in. to a minimum value of approximately 4,000 lb/in. which is achieved at a deflection value of $f_{max}$. In some cases it may be desirable to provide spring members having lower values of spring stiffness at intermediate values of deflection in order to eliminate shudder that otherwise might occur at lower steering force values. In general, this can be accomplished by scaling "lossy" spring members 408a and 408b such that they have a larger diametral size and material thickness, t, and utilize a smaller plurality of Belleville spring washers 412 each configured with a smaller $f_{max}/t$ ratio.

Figure 26:
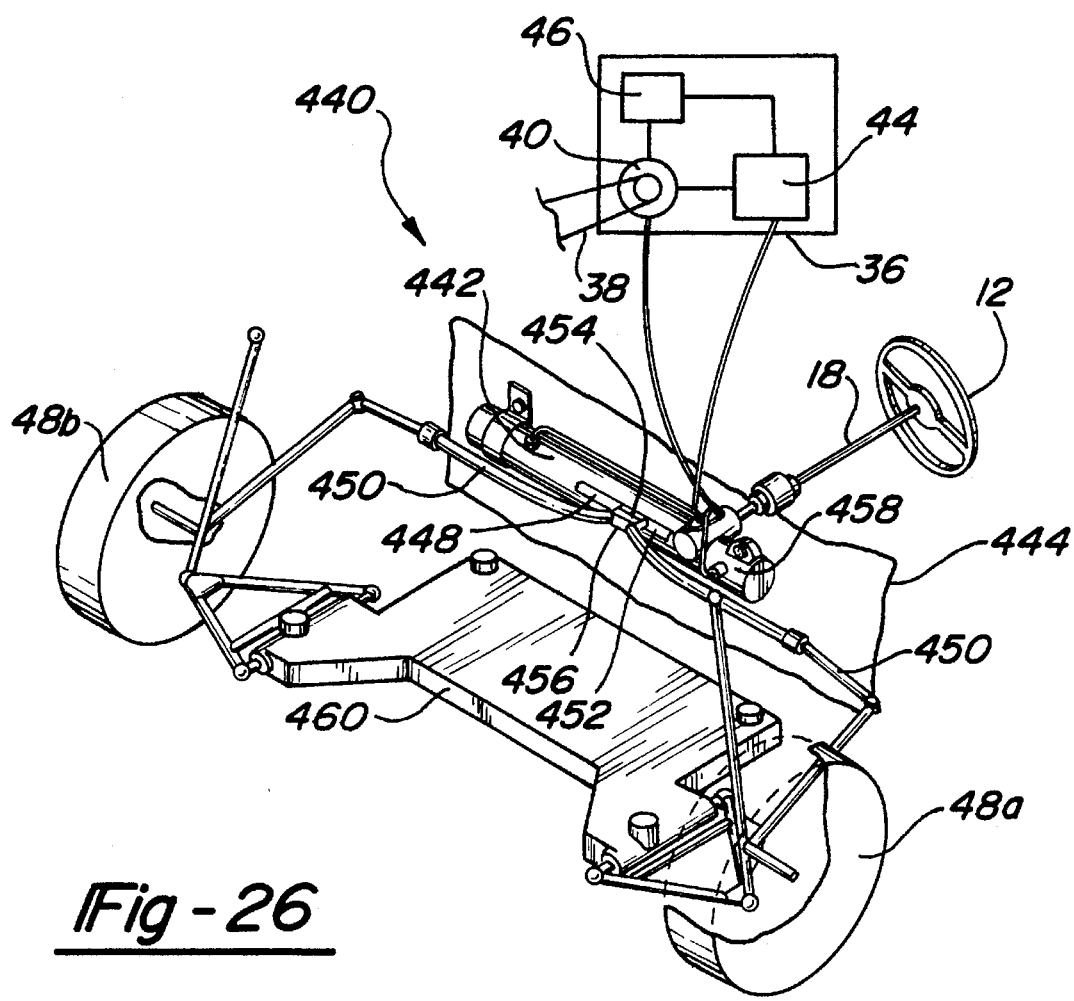
FIG. 26 is an isometric view illustrating the general relationship of the various components of a conventional Center Take-off vehicular power steering system comprising a prior art tie-rod sub-assembly.

With reference to FIG. 26, another conventional rack-and-pinion equipped power steering system 440, known by the appellation Center Take-off, and also commonly used in motor vehicles, is shown. Power steering system 440 comprises many of the components of power steering system 10 shown in FIG. 1. As such, like reference numerals are used in both FIGS. 1 and 26 to identify like components. In this case however, steering unit 442 is usually mounted to firewall 444. As opposed to a direct attachment to left and right tie-rod linkage assemblies such as tie-rod linkage assemblies 50a and 50b, housing 446 is provided with an access slot 448 via which a tie-rod linkage assembly 450 (which is connected to both dirigible wheels 48a and 48b) is affixed to piston-and-rack assembly 452 via spacer 454 and bolts 456.

Figure 27A:
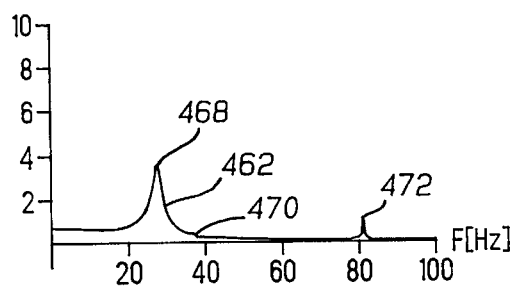
FIGS. 27A, 27B and 27C are graphical illustrations depicting performance characteristics of the power steering system depicted in FIG. 26.
Figure 27B:
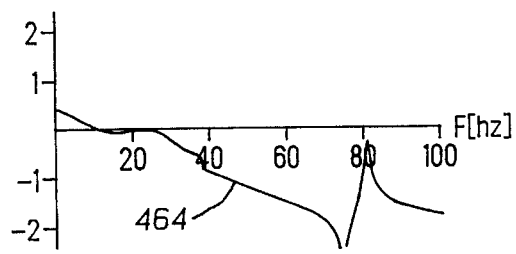
Figure 27C:
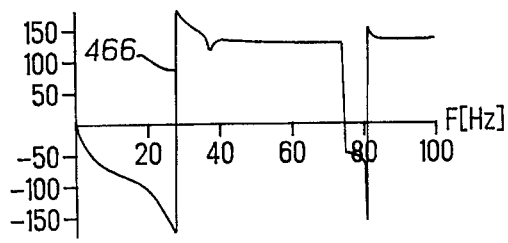

From the point of view of dynamic analysis, power steering system 440 differs fundamentally from steering system 10 in that there is minor coupling between housing 458 of steering unit 442 and dirigible wheels 48a and 48b, and that the mass of sub-frame 460 has negligible influence. With reference to FIGS. 27A, 27B and 27C, (G H)/(1+(G H)), Log[Abs[(G H)]] and Arg[(G H)] curves 462, 464 and 466, respectively, are shown wherein values of f=0.1, $M_{sf}$= 0.012 lb.sec²/in. and $K_{sf}$=600,000 lb/in. have been substituted for the above listed values therefor of f=0.8, $M_{sf}$=0.12 lb.sec²/in. and $K_{sf}$=60,000 lb/in., respectively, to effect the above change in coupling and substantially eliminate the effects of sub-frame mass. As compared with curve 188 of FIG. 6A, it can be seen that first and third peaks 468 and 472, respectively, have been substantially reduced in magnitude and further separated in frequency while second peak 470 has been virtually eliminated. However, first peak 468 still represents an unacceptable resonance.

A fourth alternative preferred embodiment of the invention is shown in FIGS. 28A, 28B and 29, wherein power steering system 480 additionally comprises a series damping device 482. Power steering system 480 comprises most of the components of power steering system 440 shown in FIG. 26. As such, like reference numerals are used in both FIGS. 26 and 28A to identify like components. With particular reference to FIG. 28B, access slot 448 is moved to an out-of-line position allowing a sleeve-body 486 portion of series damping device 482 to be connected to piston-and-rack assembly 452 via spacer 454 and bolts 456. Functionally, series damping device 482 is configured as a portion of tie-rod linkage assembly 488 whereby, for instance, steering unit 442 and tie-rod linkage assembly 488 are separated by removing bolts 456 and thus allowing removal of either from the host vehicle.

Series damping device 482 is a preloaded "lossy" compliant coupling comprising sleeve-body 486 and intermediate subassembly 490 which is built up upon tie-rod 492. Intermediate sub-assembly 490 could be constructed in the manner of any of intermediate sub-assemblies 325, 365 or 405. With reference now to FIG. 29, intermediate sub-assembly 490 comprises tie-rod 492, two bushings 494, two "lossy" spring members 496 and intermediate ring 498 in a manner similar to that depicted in FIG. 24A for intermediate sub-assembly 405. However, in intermediate sub-assembly 490 a retaining ring 500 is first installed in either of two retaining ring grooves 502 formed in a central enlarged cylindrical surface 504 of tie-rod 492 to take the place of shoulder 322 in intermediate sub-assembly 325. Then one of bushings 494, one of "lossy" spring members 496, intermediate ring 498, and the others of "lossy" spring members 496 and bushings 494 are assembled against the installed retaining ring 500 in a compressed manner. Then, the other retaining ring 500 is installed in the other retaining ring groove 502 to complete intermediate sub-assembly 490. Finally, intermediate sub-assembly 490 is installed in sleeve-body 486 and retained therein by retaining rings 506 installed in both retaining ring grooves 508.

Figure 30A:
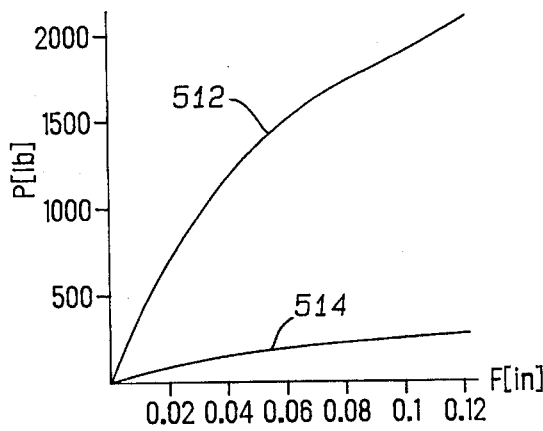
FIGS. 30A and 30B are graphical illustrations depicting load-deflection and spring stiffness values utilized in the series damping device of FIG. 29.
Figure 30B:
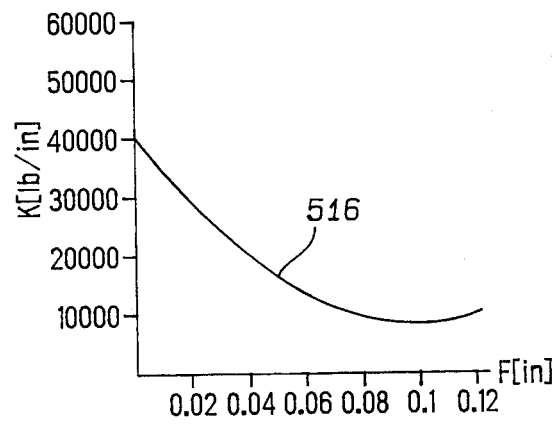

"Lossy" spring members 496 are depicted with larger diametral size and material thickness, t, and utilize Belleville spring washers 510 configured with a smaller $f_{max}/t$ ratio than Belleville spring washers 4 12. Thus, the same plurality of Belleville spring washers 510 as Belleville spring washers 412 utilized in intermediate sub-assembly 405 generates approximately twice the thrust values with generally lower spring stiffness values than a summed pair of intermediate subassemblies 405 as utilized above. This is verified with reference to FIG. 30A wherein curves 512 and 514 depict load-deflection values for a "lossy" spring member 496 and a single Belleville spring washer 510, respectively, and FIG. 30B wherein curve 516 depicts values of spring stiffness corresponding to curve 512.

Figure 31A:
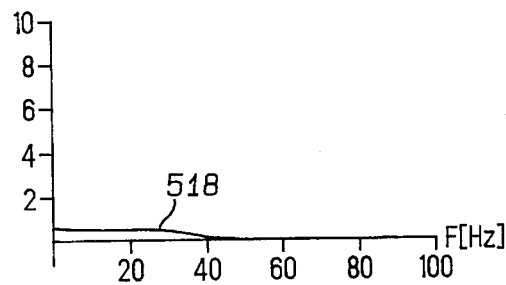
FIGS. 31A, 31B and 31C are graphical illustrations depicting improved performance characteristics of the power steering system depicted in FIGS. 28A and 28B as attained via a method of introducing series damping in the system's load positioning structure.
Figure 31B:
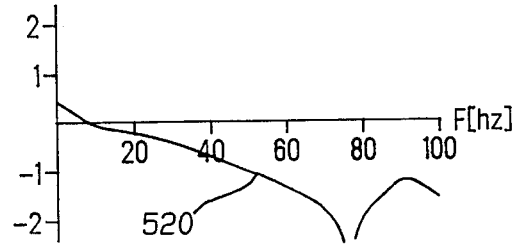
Figure 31C:
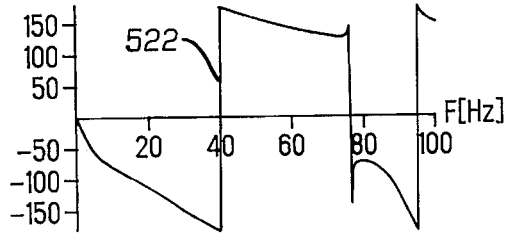

With reference to FIGS. 31A, 31B and 31C, (G H)/(1+(G H)), Log[Abs[(G H)]] and Arg[(G H)] curves 518, 520 and 522, respectively, are shown wherein values of f=0.1, $M_{sf}$=0.012 lb.sec²/in., $K_{sf}$=600,000 lb/in., $K_{rw}$=5,000 lb/in. and $B_{rw}$=50 lb.sec/in. have been substituted for the above listed values therefor of f=0.8, $M_{sf}$=0.12 lb.sec²/in., $K_{sf}$=60,000 lb/in., $K_{rw}$=10,000 lb/in. and $B_{rw}$=0.3 lb.sec/in., respectively, to effect analysis of power steering system 480. The results again depict spectacular stability characteristics and are comparable with corresponding curves 358, 360 and 362 of FIGS. 21A, 21B and 21C.

While providing a supplemental motion control damper such as depicted in FIG. 8 is a known method of achieving stability in power steering systems otherwise prone to shudder, this method results in increased steering efforts with respect to steering motion, is relatively expensive and is volumetrically inefficient. These disadvantages ensue because this method of achieving stability depends upon supplemental motion control dampers which are disposed in a parallel manner and control steering motion in an overall sense.

On the other hand, disclosed hereinabove is a fundamentally differing and improved method of achieving stability in power steering systems otherwise prone to shudder. In the improved method of achieving stability in power steering systems, series damping embodying significant damping coefficient values is utilized to provide adequate gain and phase margins in such systems' feedback characteristics. As described herein, this improved method of achieving stability in power steering systems can be implemented in a first manner by providing series damping used for absorbing energy while supporting a power steering unit, and thus providing adequate gain and phase margins in such a power steering systems' feedback characteristics to substantially prevent shudder thereof, as discussed in conjunction with a preferred embodiment of the invention depicted in FIG. 11, 12A and 12B.

Alternately, the improved method of achieving stability in power steering systems can be implemented in a second and even more effective manner by providing series damping used for absorbing energy while linking a piston-and-rack assembly of a power steering unit to dirigible wheels of a host vehicle, and thus providing adequate gain and phase margins in such a power steering systems' feedback characteristics to substantially prevent shudder thereof, as discussed in conjunction with first, second, third and fourth embodiments of the invention depicted in FIGS. 18, 19A, 19B and 19C, FIG. 22, FIGS. 24A and 24B, and FIGS. 28, 29 and 30, respectively.

Figure 32A:
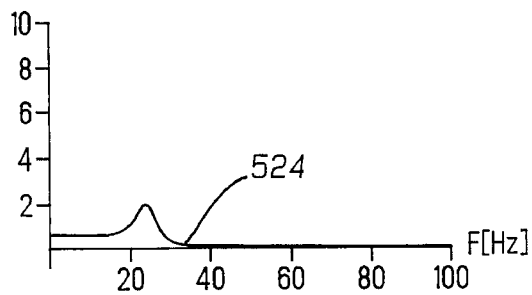
FIGS. 32A, 32B and 32C are graphical illustrations depicting performance characteristics of a power steering system utilizing a series damping device having a reduced damping values.
Figure 33A:
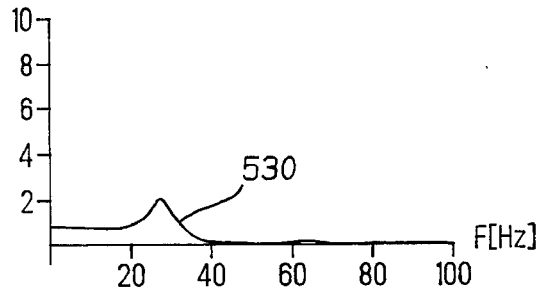
FIGS. 33A, 33B and 33C are graphical illustrations depicting performance characteristics of a power steering system utilizing a series damping device having less compliance and a reduced damping value.
Figure 32B:
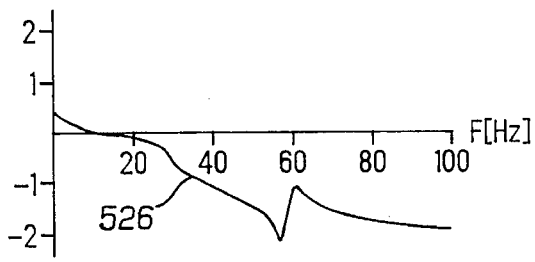
Figure 33B:
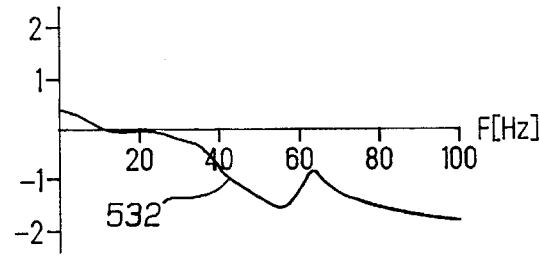
Figure 32C:
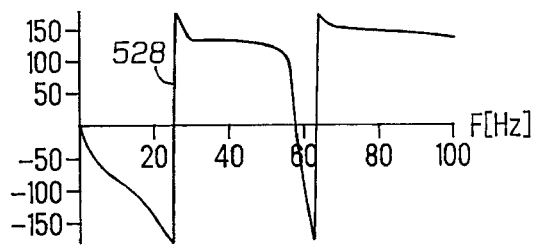
Figure 33C:
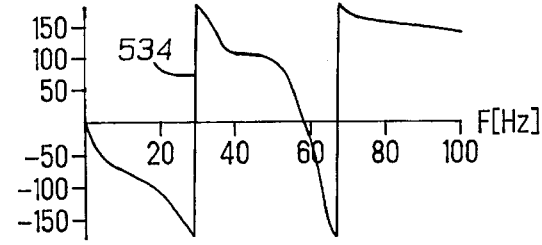

Either implementation of the improved method can result in dramatically reduced shudder susceptibility without any increase in steering effort as is thoroughly discussed hereinabove. In fact, the second implementation of the improved method is so effective that series damping so utilized can embody a wide range of damping coefficient values and still be quite acceptable in shudder suppression. For instance, with reference to FIGS. 32A, 32B and 32C, Log[Abs[(G H)]] and Arg[(G H)] where curves 524, 526 and 528, respectively, are shown for values of $K_{rw}$=5,000 lb/in. and $B_{rw}$=4.5 lb.sec/in., and with further reference to FIGS. 33A, 33B and 33C, Log[Abs[(G H)]] and Arg[(G H)] where curves 530, 532 and 534, respectively, are shown for values of $K_{rw}$=8,000 lb/in. and $B_{rw}$=9.0 lb.sec/in. In each case, the sets of values mentioned have been substituted for the above listed values of $K_{rw}$=10,000 lb/in. and $B_{rw}$=0.3 lb.sec/in. With either set of values, it can be seen that shudder suppression is at least as effective as that shown in FIGS. 9A, 9B and 9C for a power steering system comprising a supplemental motion control damper. These sets of values for $K_{rw}$ and $B_{rw}$ can be used as a basis for empirically derived equation $$B_{erw} = 0.2 \ ((K_{sdd} \ F)/(F_{tpk} \ (K_{sdd} + K_{lrw})))$$

where the empirically determined constant 0.2 Hz.sec/in. is appropriate only for the in-lb-sec system of measurement used herein because it is not dimensionless (i.e., its value would be 2.4 Hz.sec/ft in a ft-lb-sec system of measurement), $B_{erw}$ is an acceptable minimum value of effective overall series damping coefficient for the complete tie-rod linkage assembly which should provide for stable, substantially shudder-free operation of a host power steering system, $K_{sdd}$ is stiffness of the series damping device utilized, $F_{tpk}$ is peak steering force required, F is frequency of the lowest shudder frequency to be eliminated and $K_{lrw}$ is overall transverse stiffness for the host tie-rod linkage assembly (i.e., without the series damping device) such as the above listed value of 10,000 lb/in.

I claim:

1. A series damping device for enhancing a shudder stability in a hydro-mechanical system, said damping device comprising:

a frame;

a hydraulic actuator having a driven member reciprocally displaceable along an axis;

a linkage assembly connected to said driven member of said actuator;

means for compliantly coupling said hydraulic actuator to one of said frame and said linkage assembly, said means for compliantly coupling having at least one first biasing element and at least one second biasing element positioned to exert a biasing force along said axis, said first biasing element being preloaded and having a first predetermined stiffness, said at least one second biasing element having a second predetermined stiffness which is less than said first predetermined stiffness, and applied only when said driven member is axially displaced by said hydraulic actuator to exert a force upon said means for coupling greater than said first predetermined stiffness of said at least one biasing member.

2. The series damping device of claim 1 wherein each at least one first biasing member has non-linear load deflection value.

3. The series damping device of claim 1, wherein said at least one first biasing member is a Belleville washer.

4. The series damping device of claim 1, wherein said at least one first biasing member comprises a plurality of Belleville washers.

5. The series damping device of claim 1 wherein said at least one second biasing member is formed of a lossy material.

6. The series damping device of claim 5, wherein said lossy material has a damping coefficient value of generally 50 lb. sec/in.

7. The series damping device of claim 1 wherein said at least one second biasing member comprises an elastomeric bumper.

8. The series damping device of claim 1, further comprising a pair of spaced apart bushings mounted to said driven member, said at least one first and at least one second biasing members being disposed between said bushings.

9. The series damping device of claim 1, wherein said first biasing member is partially compressed when said drive member is exerting no force upon said means for coupling.

10. A method for enhancing shudder stability in power steering systems, said method comprising the steps of:

compliantly coupling one of a linkage assembly and a frame to a driven member of a hydraulic actuator with at least one biasing member having a predetermined stiffness in an axial direction; and coupling a second biasing member to said first biasing member in an axial direction said second biasing member having a second predetermined stiffness lower in value than said first predetermined stiffness when said driven member exerts a force greater than said predetermined force of said first biasing member.

* * * * *